United States Patent
Karampatsis et al.

(10) Patent No.: US 9,668,234 B2
(45) Date of Patent: *May 30, 2017

(54) METHOD AND APPARATUS FOR TRIGGERING A MACHINE TYPE COMMUNICATION DEVICE

(71) Applicant: InterDigital Patent Holdings, Inc., Wilmington, DE (US)

(72) Inventors: Dimitrios Karampatsis, Ruislip (GB); Kamel M. Shaheen, King of Prussia, PA (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/696,758

(22) Filed: Apr. 27, 2015

(65) Prior Publication Data

US 2015/0230198 A1    Aug. 13, 2015

Related U.S. Application Data

(63) Continuation of application No. 13/435,330, filed on Mar. 30, 2012, now Pat. No. 9,020,540.

(Continued)

(51) Int. Cl.
*H04B 7/00* (2006.01)
*H04W 4/00* (2009.01)
(Continued)

(52) U.S. Cl.
CPC .......... *H04W 68/00* (2013.01); *H04W 4/005* (2013.01); *H04W 60/04* (2013.01); *H04W 76/048* (2013.01)

(58) Field of Classification Search
CPC ....................................................... H04W 4/20
(Continued)

(56) References Cited

U.S. PATENT DOCUMENTS

| 8,169,957 B2 * | 5/2012 | Damnjanovic ... H04W 52/0216 370/318 |
| 8,750,145 B2 * | 6/2014 | Shaheen ............... H04L 63/104 370/252 |

(Continued)

FOREIGN PATENT DOCUMENTS

| WO | 2008/097965 A2 | 8/2008 | |
| WO | WO2008097965 A2 * | 8/2008 | ............ H04W 52/02 |
| WO | 2010/059741 | 5/2010 | |

OTHER PUBLICATIONS

Ericsson et al., "Device triggering and E.164 MSISDN replacement," 3GPP TSG SA WG2 Meeting #78, S2-101169, San Francisco, California, USA (Feb. 22-26, 2010).

(Continued)

*Primary Examiner* — Tilahun B Gesesse
(74) *Attorney, Agent, or Firm* — Volpe and Koenig, P.C.

(57) ABSTRACT

A method and apparatus for triggering a machine type communication (MTC) wireless transmit/receive unit (WTRU) is disclosed. An MTC WTRU receives a message that indicates control period configuration information associated with an extended discontinuous reception (DRX) cycle. The MTC WTRU monitors a paging channel during a control period. The MTC WTRU connects, in response to receiving a paging message during the control period, to an MTC server and transmits data to the MTC server.

20 Claims, 16 Drawing Sheets

Related U.S. Application Data

(60) Provisional application No. 61/470,956, filed on Apr. 1, 2011.

(51) Int. Cl.
    H04M 1/00 (2006.01)
    H04W 68/00 (2009.01)
    H04W 60/04 (2009.01)
    H04W 76/04 (2009.01)

(58) Field of Classification Search
    USPC .................................. 455/515, 418; 370/329
    See application file for complete search history.

(56) References Cited

U.S. PATENT DOCUMENTS

| 8,879,413 | B2 | 11/2014 | Zhi et al. | |
| 2008/0186892 | A1* | 8/2008 | Damnjanovic | ... H04W 52/0216 370/311 |
| 2010/0130237 | A1* | 5/2010 | Kitazoe | ............... H04W 76/048 455/458 |
| 2011/0128911 | A1* | 6/2011 | Shaheen | ............... H04L 63/104 370/328 |
| 2011/0134841 | A1* | 6/2011 | Shaheen | ................. H04W 4/00 370/328 |
| 2012/0004003 | A1* | 1/2012 | Shaheen | ............... H04W 4/005 455/509 |

OTHER PUBLICATIONS

Interdigital Communications Corporation, "Classification of Time Controlled feature for TS 22.368," 3GPP TSG-SA1 #49, S1-100363 (Feb. 22-26, 2010).
Interdigital Communications, "A method to trigger detached devices using the paging channel," 3GPP SA WG2 Meeting #83, TD S2-110670 (Feb. 21-25, 2011).
Interdigital Communications, "Synchronisation between MTC device and MTC server/3GPP core network," 3GPP TSG SA WG2 Meeting #84, TD S2-111798 (Apr. 11-15, 2011).
Interdigital Communications, "Triggering a detached MTC device," 3GPP TSG SA WG2 Meeting #83, TD S2-110673 (Feb. 21-25, 2011).
Interdigital Communications, "Triggering synchronisation for online MTC devices," 3GPP TSG SA WG2 Meeting #85, TD S2-112555 (May 16-20, 2011).
Sierra Wireless, "Solution for MTC Device Trigger indication from MTC Server," 3GPP TSG SA WG2 Meeting #83, S2-111256, Salt Lake City, Utah, USA (Feb. 21-25, 2011).
Third Generation Partnership Project, "Technical Specification Group Services and System Aspects; General Packet Radio Service (GPRS); Service description; Stage 2 (Release 11)," 3GPP TS 23.060 V11.1.0 (Mar. 2012).
Third Generation Partnership Project, "Technical Specification Group Services and System Aspects; General Packet Radio Service (GPRS); Service description; Stage 2 (Release 4)," 3GPP TS 23.060 V4.11.0 (Dec. 2006).
Third Generation Partnership Project, "Technical Specification Group Services and System Aspects; General Packet Radio Service (GPRS); Service description; Stage 2 (Release 5)," 3GPP TS 23.060 V5.13.0 (Dec. 2006).
Third Generation Partnership Project, "Technical Specification Group Services and System Aspects; General Packet Radio Service (GPRS); Service description; Stage 2 (Release 6)," 3GPP TS 23.060 V6.15.0 (Dec. 2006).
Third Generation Partnership Project, "Technical Specification Group Services and System Aspects; General Packet Radio Service (GPRS); Service description; Stage 2 (Release 8)," 3GPP TS 23.060 V8.15.0 (Mar. 2012).
Third Generation Partnership Project, "Technical Specification Group Services and System Aspects; General Packet Radio Service (GPRS); Service description; Stage 2 (Release 7)," 3GPP TS 23.060 V7.10.0 (Sep. 2010).
Third Generation Partnership Project, "Technical Specification Group Services and System Aspects; General Packet Radio Service (GPRS); Service description; Stage 2 (Release 8)," 3GPP TS 23.060 V8.12.0 (Mar. 2011).
Third Generation Partnership Project, "Technical Specification Group Services and System Aspects; General Packet Radio Service (GPRS); Service description; Stage 2 (Release 7)," 3GPP TS 23.060 V7.11.0 (Jun. 2011).
Third Generation Partnership Project, "Technical Specification Group Services and System Aspects; General Packet Radio Service (GPRS); Service description; Stage 2 (Release 9)," 3GPP TS 23.060 V9.8.0 (Mar. 2011).
Third Generation Partnership Project, "Technical Specification Group Services and System Aspects; General Packet Radio Service (GPRS); Service description; Stage 2 (Release 9)," 3GPP TS 23.060 V9.12.0 (Mar. 2012).
Third Generation Partnership Project, "Technical Specification Group Services and System Aspects; General Packet Radio Service (GPRS); Service description; Stage 2 (Release 1999)," 3GPP TS 23.060 V3.17.0 (Dec. 2006).
Third Generation Partnership Project, "Technical Specification Group Services and System Aspects; General Packet Radio Service (GPRS); Service description; Stage 2 (Release 10)," 3GPP TS 23.060 V10.7.0 (Mar. 2012).
Third Generation Partnership Project, "Technical Specification Group Services and System Aspects; General Packet Radio Service (GPRS); Service description; Stage 2 (Release 10)," 3GPP TS 23.060 V10.3.0 (Mar. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.13.0 (Mar. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.12.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.7.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.3.0 (Mar. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.8.0 (Mar. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.1.0 (Mar. 2012).
Third Generation Partnership Project, "Technical Specification Group Services and System Aspects; System Improvements for Machine-Type Communications; (Release 11)," 3GPP TR 23.888 V1.2.0 (Apr. 2011).
Third Generation Partnership Project, "Technical Specification Group Services and System Aspects; System Improvements for Machine-Type Communications (Release 11)," 3GPP TR 23.888 V1.6.1 (Feb. 2012).

(56) References Cited

OTHER PUBLICATIONS

Third Generation Partnership Project, "Technical Specification Group Services and System Aspects; System Improvements for Machine-Type Communications; (Release 11)," 3GPP TR 23.888 V1.1.0 (Mar. 2011).

Third Generation Partnership Project, "Technical Specification Group Services and System Aspects; Study on Enhancements for MTC; (Release 11)," 3GPP TSG-SA WG1 Meeting #57, S1-120348 (Feb. 13-17, 2012).

Third Generation Partnership Project, "Technical Specification Group Core Network and Terminals; Interworking between the Public Land Mobile Network (PLMN) supporting packet based services and Packet Data Networks (PDN) (Release 7)," 3GPP TS 29.061 V7.12.0 (Mar. 2010).

Third Generation Partnership Project, "Technical Specification Group Core Network and Terminals; Interworking between the Public Land Mobile Network (PLMN) supporting packet based services and Packet Data Networks (PDN) (Release 9)," 3GPP TS 29.061 V9.8.0 (Dec. 2011).

Third Generation Partnership Project, "Technical Specification Group Core Network and Terminals; Interworking between the Public Land Mobile Network (PLMN) supporting packet based services and Packet Data Networks (PDN) (Release 5)," 3GPP TS 29.061 V5.9.1 (Jun. 2005).

Third Generation Partnership Project, "Technical Specification Group Core Network and Terminals; Interworking between the Public Land Mobile Network (PLMN) supporting packet based services and Packet Data Networks (PDN) (Release 9)," 3GPP TS 29.061 V9.4.0 (Sep. 2010).

Third Generation Partnership Project, "Technical Specification Group Core Network and Terminals; Interworking between the Public Land Mobile Network (PLMN) supporting packet based services and Packet Data Networks (PDN) (Release 8)," 3GPP TS 29.061 V8.8.0 (Sep. 2011).

Third Generation Partnership Project, "Technical Specification Group Core Network and Terminals; Interworking between the Public Land Mobile Network (PLMN) supporting packet based services and Packet Data Networks (PDN) (Release 1999)," 3GPP TS 29.061 V3.14.1 (Jun. 2005).

Third Generation Partnership Project, "Technical Specification Group Core Network and Terminals; Interworking between the Public Land Mobile Network (PLMN) supporting packet based services and Packet Data Networks (PDN) (Release 11)," 3GPP TS 29.061 V11.0.0 (Mar. 2012).

Third Generation Partnership Project, "Technical Specification Group Core Network and Terminals; Interworking between the Public Land Mobile Network (PLMN) supporting packet based services and Packet Data Networks (PDN) (Release 10)," 3GPP TS 29.061 V10.5.0 (Dec. 2011).

Third Generation Partnership Project, "Technical Specification Group Core Network and Terminals; Interworking between the Public Land Mobile Network (PLMN) supporting packet based services and Packet Data Networks (PDN) (Release 10)," 3GPP TS 29.061 V10.1.0 (Dec. 2010).

Third Generation Partnership Project, "Technical Specification Group Core Network and Terminals; Interworking between the Public Land Mobile Network (PLMN) supporting packet based services and Packet Data Networks (PDN) (Release 8)," 3GPP TS 29.061 V8.6.0 (Jun. 2010).

Third Generation Partnership Project, "Technical Specification Group Core Network and Terminals; Interworking between the Public Land Mobile Network (PLMN) supporting packet based services and Packet Data Networks (PDN) (Release 6)," 3GPP TS 29.061 V6.15.0 (Dec. 2008).

Third Generation Partnership Project, "Technical Specification Group Core Network and Terminals; Interworking between the Public Land Mobile Network (PLMN) supporting packet based services and Packet Data Networks (PDN) (Release 4)," 3GPP TS 29.061 V4.10.1 (Jun. 2005).

Third Generation Partnership Project, "Technical Specification Group Services and System Aspects; Service requirements for Machine-Type Communications (MTC); Stage 1 (Release 10)," 3GPP TS 22.368 V10.3.1 (Feb. 2011).

Third Generation Partnership Project, "Technical Specification Group Services and System Aspects; Service requirements for Machine-Type Communications (MTC); Stage 1 (Release 10)," 3GPP TS 22.368 V10.5.0 (Jun. 2011).

Third Generation Partnership Project, "Technical Specification Group Services and System Aspects; Service requirements for Machine-Type Communications (MTC); Stage 1 (Release 11)," 3GPP TS 22.368 V11.0.1 (Feb. 2011).

Third Generation Partnership Project, "Technical Specification Group Services and System Aspects; Service requirements for Machine-Type Communications (MTC); Stage 1 (Release 11)," 3GPP TS 22.368 V11.4.0 (Mar. 2012).

\* cited by examiner

US 9,668,234 B2

METHOD AND APPARATUS FOR TRIGGERING A MACHINE TYPE COMMUNICATION DEVICE

CROSS REFERENCE TO RELATED APPLICATIONS

This application is a continuation of U.S. patent application Ser. No. 13/435,330 filed Mar. 30, 2012, which claims the benefit of U.S. provisional application No. 61/470,956, filed Apr. 1, 2011, the contents of all of which are hereby incorporated by reference herein.

FIELD OF INVENTION

This application is related to wireless communications.

BACKGROUND

A communication device, such as a wireless transmit/receive unit (WTRU), may communicate with a remote device via a communication system. The WTRU may be configured to perform machine-to-machine (M2M) or machine-type communications (MTC), which are communications that may be performed without human interaction. In certain instances, MTC WTRUs need to be triggered to enable communications with a network.

SUMMARY

Methods and apparatus for triggering and synchronizing machine type communication (MTC) wireless transmit/receive unit (WTRU) (MTC WTRUs) are described herein. MTC WTRUs may operate in a time controlled mode, where the MTC WTRU attaches to a network at specified intervals to report to the network. The time controlled mode may include two time controlled cycles, a reporting cycle, where the device attaches, for example, once a month to provide data to the network and a control cycle where the device attaches, for example, once a day, to receive updates from the network. Methods are also described for communicating the reporting and control cycles between the MTC WTRU and the network or MTC server. These cycles may be communicated on an application layer, by an MTC server using an MTCsp interface or via MTC WTRU configuration. In addition, the reporting and control cycles, which may also be referred to as triggering cycles, may be sent via the Non-Access-Stratum (NAS) layer by extending discontinuous reception (DRX) cycles or by allowing a network to send the cycles over a broadcast channel by defining new System information block (SIB) information.

Information indicating at least one control period and at least one reporting period may be obtained by the MTC WTRU before entering an idle/offline mode. The MTC WTRU may monitor for triggering information on either a paging channel or a broadcast channel during the control period. The MTC WTRU may establish a connection with an MTC server during the reporting period to report information, such as location information or application related information (e.g. electricity metering information). The MTC WTRU may be configured so that the control period is the same as a discontinuous reception (DRX) cycle on a condition that a paging channel is used to trigger the MTC WTRU. The MTC WTRU may wake up during the control period to monitor a broadcast channel for triggering information on a condition that the broadcast channel is used to trigger the MTC WTRU.

A paging channel, (via optimized discontinuous reception (DRX) timing), or a broadcast channel, (based on new broadcast channel information), may be used to trigger the MTC WTRU. Certain solutions, however, may provide such triggering while maintaining synchronization between the MTC WTRU and the MTC architecture.

BRIEF DESCRIPTION OF THE DRAWINGS

A more detailed understanding may be had from the following description, given by way of example in conjunction with the accompanying drawings wherein.

DETAILED DESCRIPTION

Figure 1:
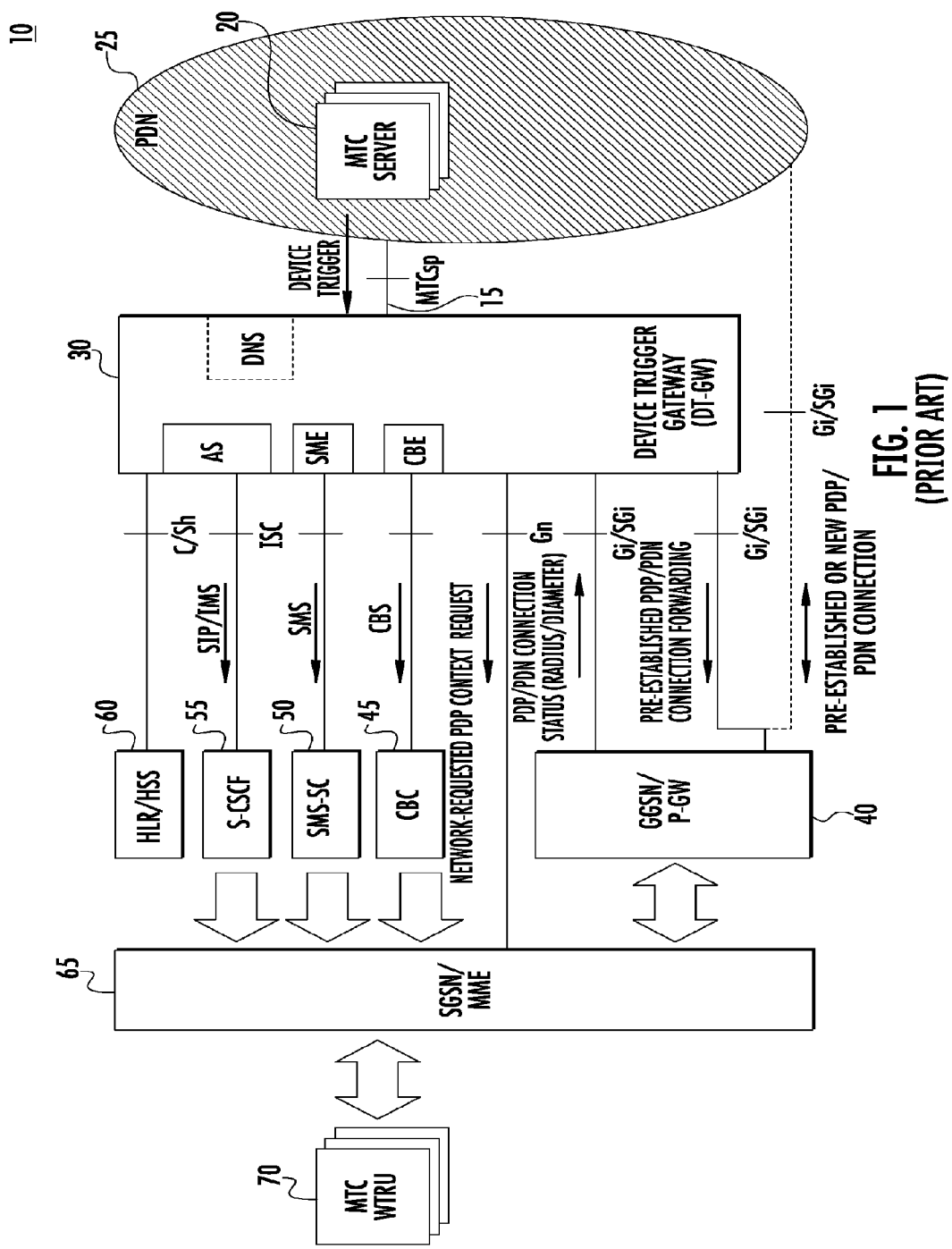
FIG. 1 shows a conventional machine type communication (MTC) architecture used for machine type (MTC) wireless transmit/receive unit (WTRU) (MTC WTRU) triggering.

FIG. 1 shows a conventional machine type communication (MTC) architecture 10 that may use an MTCsp interface 15 between an MTC server 20 in a packet data network (PDN) 25 and a device trigger gateway (DT-GW) 30. The MTCsp interface 15 may be used to provide triggering messages from the MTC server 20 to the DT-GW 30. The DT-GW 30 may reformat and forward the triggering messages to a gateway general packet radio service (GPRS) support node (GGSN)/packet gateway (PGW) 40, cell broadcast center (CBC) 45, short message service-service center (SMS-SC) 50, and serving call session control function (S-CSCF) 55. The MTC architecture 10 may further include a home location register (HLR)/home subscriber server (HSS) 60 and a serving general packet radio service (GPRS) support node (SGSN)/mobility management entity (MME) 65 and an MTC WTRU 70.

The DT-GW 30 may use reachability information obtained from the HLR/HSS 60, the radius/diameter interface obtained from the GGSN/PGW 40, and mobile network operator (MNO) configured policy information to determine the most efficient and effective service and route to use for forwarding a trigger indication to the MTC WTRU 70. As described above, the DT-GW 30 may reformat and forward the trigger indication to 1) the GGSN/PGW 40 for delivery over an already established packet data protocol (PDP) context/packet data network (PDN) connection; 2) the GGSN of the GGSN/PGW 40 for delivery over a newly established PDP context, (via a network-requested PDP context activation procedure initiated by the DT-GW 30); 3) the S-CSCF 55 for delivery over session initiation protocol (SIP)/Internet protocol (IP) multimedia subsystem (IMS) service; 4) the SMS-SC 50 for delivery over SMS; or 5) the CBC 45 for broadcast delivery over cell broadcast service (CBS), (assuming that location information is available in the trigger indication request or from other source in order to limit the broadcast area).

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, an evolved Node-B (eNB), a site controller, an access point (AP), or any other type of interfacing device capable of operating in a wireless environment.

Figure 2A:
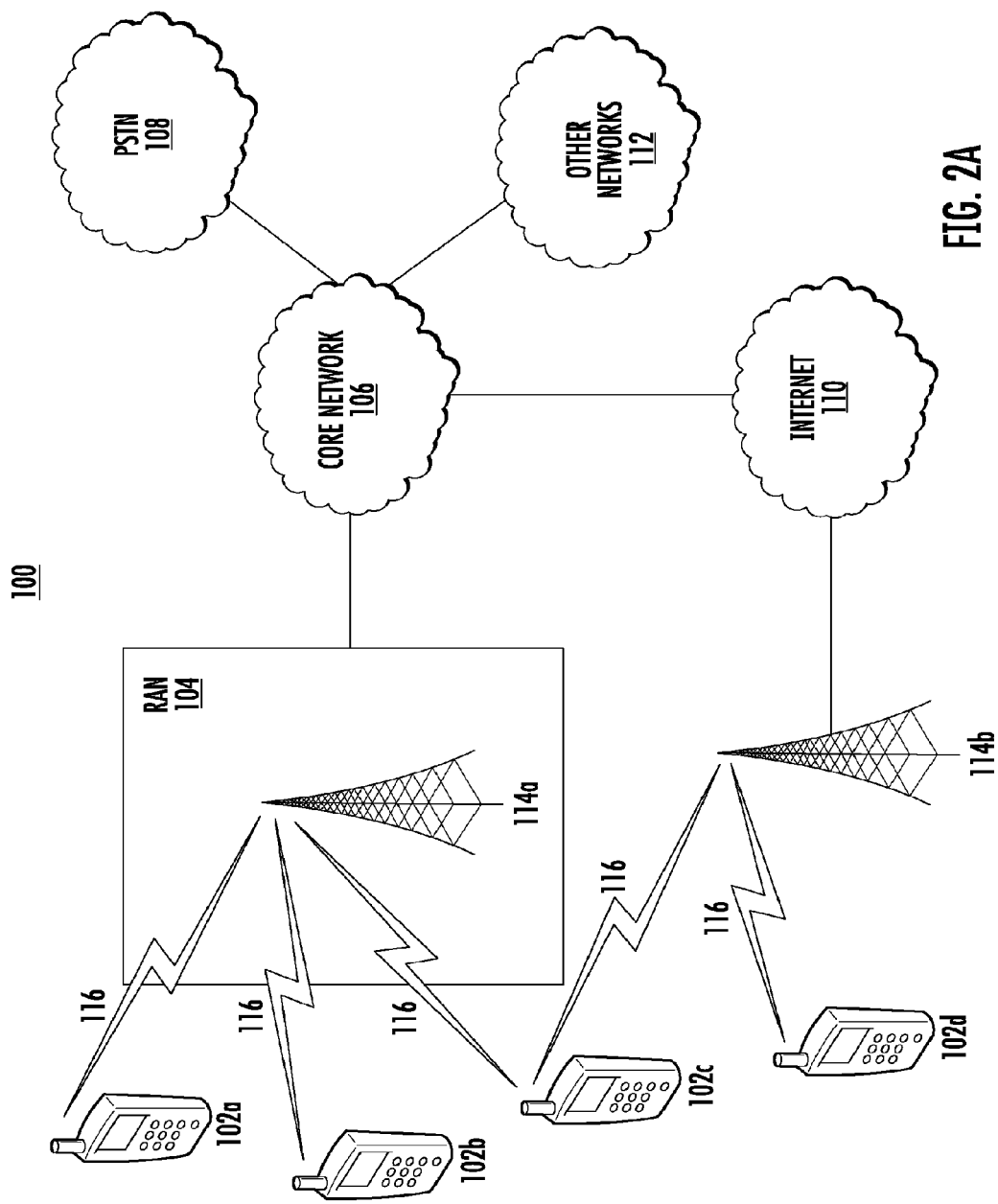
FIG. 2A shows an example communications system in which one or more disclosed embodiments may be implemented.

FIG. 2A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 2A, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed DL packet access (HSDPA) and/or high-speed UL packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 2A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 2A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 2A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 2A may be configured to communicate with the base station 114a, which may employ a cellular-based radio technology, and with the base station 114b, which may employ an IEEE 802 radio technology.

Figure 2B:
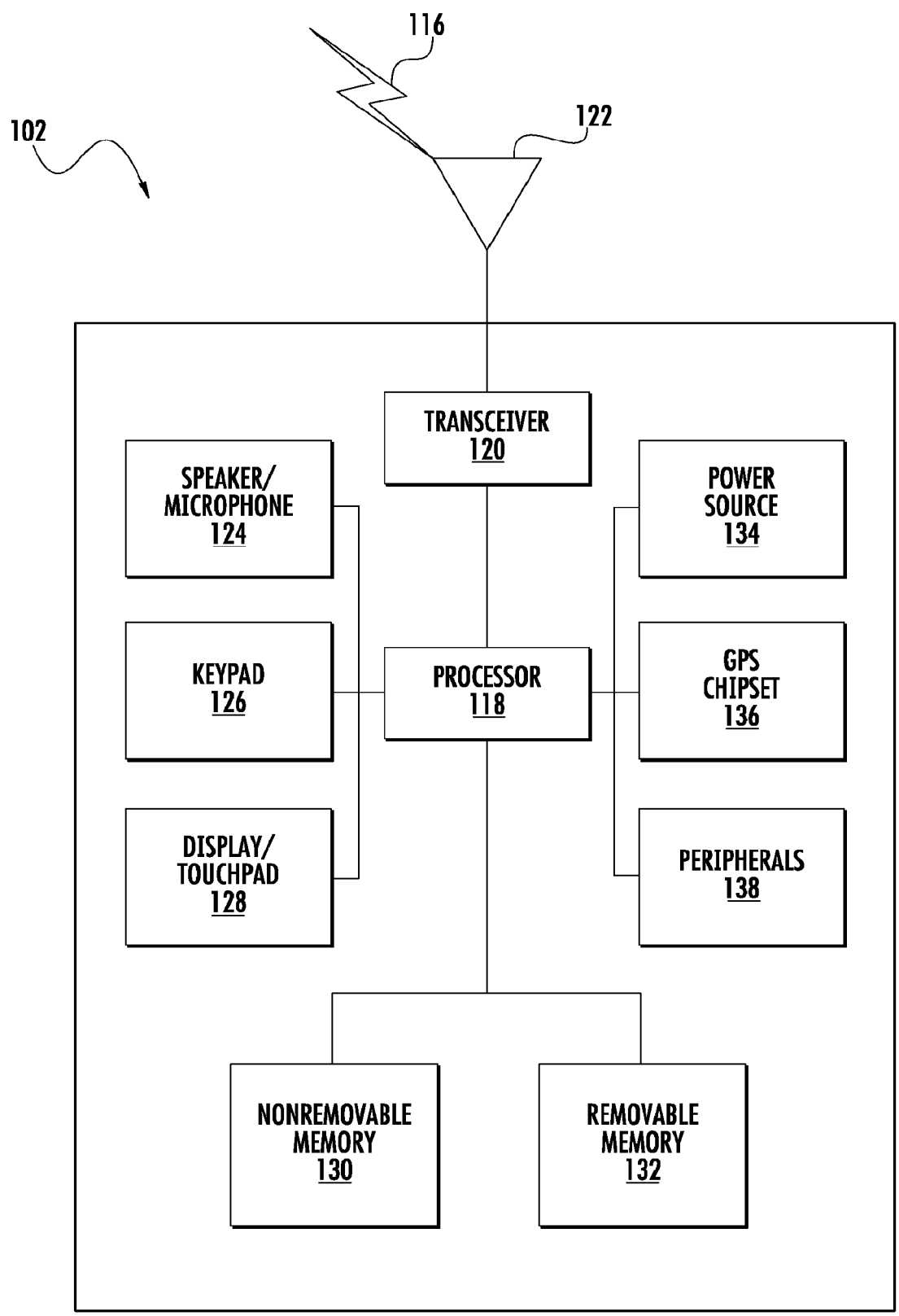
FIG. 2B shows an example WTRU that may be used within the communications system shown in FIG. 2A.

FIG. 2B shows an example WTRU 102 that may be used within the communications system 100 shown in FIG. 2A. As shown in FIG. 2B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 2B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 2C:
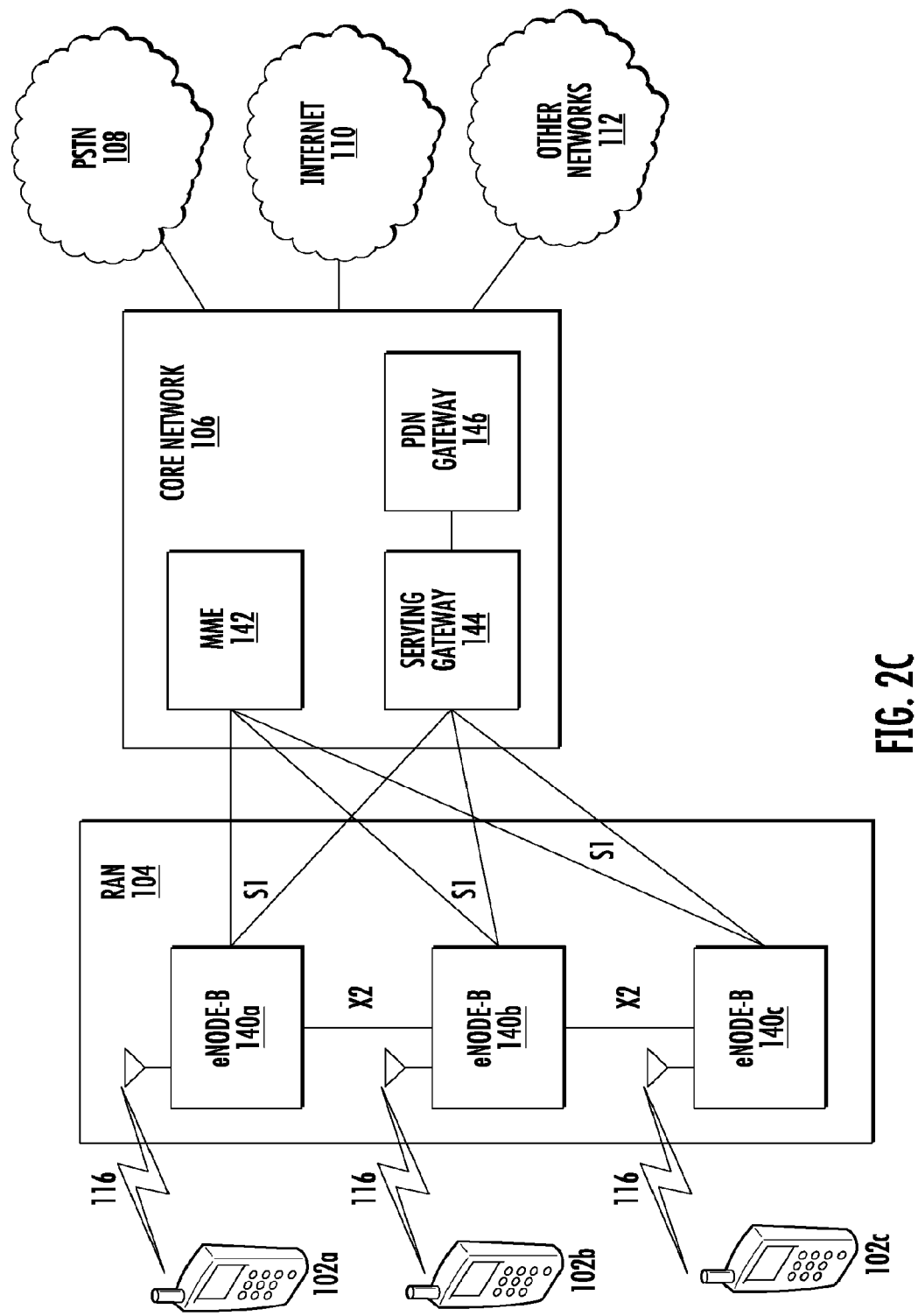
FIG. 2C shows an example radio access network and an example core network (CN) that may be used within the communications system shown in FIG. 2A.

FIG. 2C shows an example RAN 104 and an example core network 106 that may be used within the communications system 100 shown in FIG. 2A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the UL and/or DL, and the like. As shown in FIG. 2C, the eNBs 140a, 140b, 140c may communicate with one another over an X2 interface.

The core network 106 shown in FIG. 2C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when DL data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to other networks 112, which may include other wired or wireless networks that are owned and/or operated by other service providers.

A broadcast channel may provide information within various system information (SI) types, each of which provides information required by WTRUs, (e.g., network information (mobile country code (MCC)/mobile network code (MNC) of a network), frequency synchronization parameters, and the like).

Discontinuous reception (DRX) is used in mobile communications to conserve the battery of the WTRU. The WTRU and the network negotiate phases in which data transfer occurs. During other times, the mobile device turns its receiver off and enters a low power state. A DRX cycle may be negotiated by the network or sent by the mobile device.

An offline device, (i.e., a detached device, for example, an MTC WTRU), is in packet mobility management (PMM)-DETACHED or evolved packet system (EPS) mobility management (EMM)-DEREGISTERED state for a UTRAN and E-UTRAN, respectively. An offline device is not aware of its location unless it registers with a cell.

The MME/SGSN knows the location on per tracking area (TA) or routing area (RA) identity granularity when the WTRU is in EPS Connection Management (ECM)-IDLE or IDLE (PMM-IDLE) state, respectively. In addition, the MME/SGSN knows the location of the WTRU on a per cell identity (ID) granularity when the WTRU is in an ECM-CONNECTED or READY/PMM-CONNECTED state.

A paging channel, (via optimized discontinuous reception (DRX) timing), or a broadcast channel, (based on new broadcast channel information), may be used for triggering an MTC WTRU. When triggering via the paging channel, there is a need to synchronize DRX between the MTC WTRU and the network due to the occurrence of long DRX periods and off-line MTC WTRUs. In addition, when triggering via the broadcast channel, the MTC WTRU needs to know when to receive communications, and the network needs to know when to send communications in order to maintain synchronization.

Two main wake-up cycles/periods for an MTC WTRU are described herein: 1) a "reporting period," where all MTC WTRUs are reporting usage data to the network, and 2) "control periods," where an MTC server may initiate control related communication to these MTC WTRUs. During a control period, MTC WTRUs wake up and monitor the 3rd Generation Partnership Project (3GPP) control channels for pages or Short Message Service (SMS) messages addressed to a group or individual MTC WTRUs. When the MTC server triggers the MTC WTRUs via the MTCsp interface, the MTC server provides information on new/update control and/or reporting periods. Based on implementation, a 3GPP operator or MTC server may only use the control period. In such a case, the MTC WTRU may monitor a channel for paging information. The MTC WTRU enters its reporting cycle if paged by the MTC server, (if the MTC WTRU is not paged, it does not attach to the network).

In addition, the control and reporting periods may be used by the MTC WTRU and the network in order to monitor the current location of a mobile device. This option would be particularly applicable to MTC WTRUs that are usually detached from the network. During the control periods, a detached device may monitor the paging or the broadcast channel for new location information, a new tracking area (TA) or a routing area (RA), which is not included in a location area list that is stored on the device. In such a case, the device may carry out attach procedures, report its location and then detach.

The reporting and control cycles, which may also be referred to as triggering cycles, may be sent via the Non-Access-Stratum (NAS) layer by extending discontinuous reception (DRX) cycles or by allowing a network to send the cycles over a broadcast channel by defining new System information block (SIB) information.

Different embodiments for controlling and reporting cycles between the MTC WTRU and the 3GPP core network and/or MTC server are described below.

In a first embodiment, all synchronization signaling may be carried out on top of Internet protocol (IP), (i.e., by an application). In this embodiment, the MTC server may provide new or updated control and reporting periods via an application, (on top of IP), when the MTC WTRU attaches to the network and sets up a session with the MTC server. The MTC WTRU connects to the MTC server if paged by the server, (e.g., during a control interval), or during the reporting interval. The 3GPP CN is not aware of the synchronization periods, (it provides the backbone for carrying out the signaling and related procedures).

If triggering of the MTC WTRU is carried out via the paging channel, (and optimized DRX cycles are used), then the optimized DRX cycle is mapped to a control period, and the MTC server may send new and/or updated DRX cycles to the MTC WTRU via IP. The MTC WTRU may report the updated DRX cycles to the 3GPP core network, (via a tracking/routing area update or attach/detach request procedures). If triggering of the MTC WTRU is carried out via the broadcast channel, then the MTC server sends details on control/reporting cycles via IP, as well as which broadcast channel to monitor. The MTC WTRU monitors the broadcast channel for triggering information during the control periods.

Figure 3:
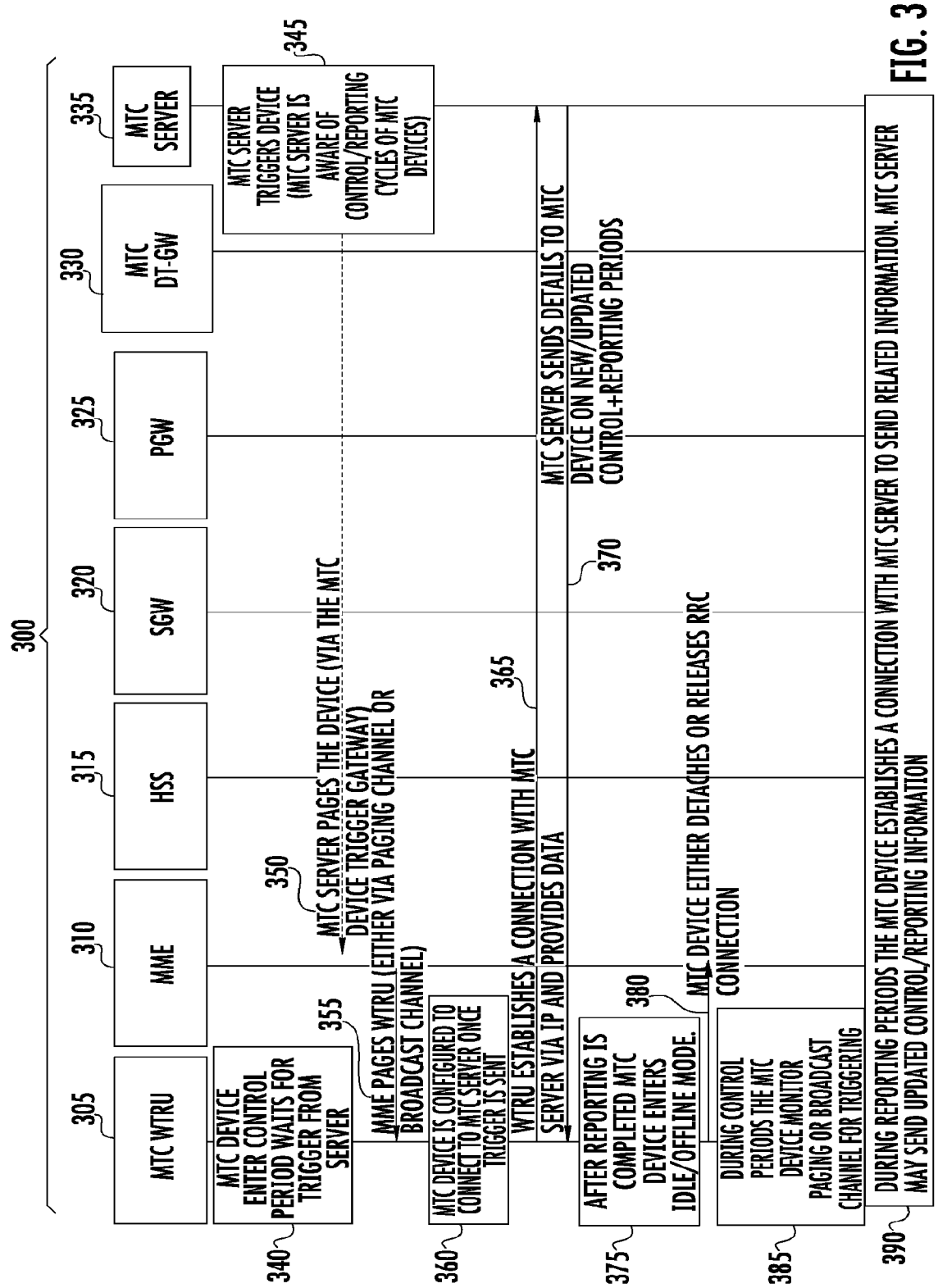
FIG. 3 shows an example signal flow within an MTC architecture in which an MTC server provides control/reporting periods for an evolved universal terrestrial radio access network (E-UTRAN) case.

FIG. 3 shows an example signal flow within an MTC architecture 300 in which an MTC server 335 provides control/reporting periods for an E-UTRAN case. The MTC architecture 300 includes an MTC WTRU 305, an MME 310, an HSS 315, a Serving Gateway (SGW) 320, a PGW 325, an MTC DT-GW 330 and an MTC server 335. The MTC DT-GW 330 and other similarly tagged entities are the same as the DT-GW 30 of FIG. 1, which may be used to handle MTC WTRUs, e.g., conveying triggering indications from the MTC server to the MTC WTRUs.

The MTC WTRU 305 enters a control period and waits for a trigger from the MTC server 335 (340). If a paging channel is used, the MTC WTRU 305 is configured so that the control period is the same as the DRX cycle. If a broadcast channel is used, the MTC WTRU 305 wakes up during the control period to monitor the broadcast channel for triggering information. The MTC server 335 triggers the MTC WTRU 305, (the MTC server 335 is aware of control/reporting cycles of the MTC WTRU 305) (345). If a paging channel is used to trigger the MTC WTRU 305, the MTC server 335 is aware of DRX cycles. If a broadcast channel is used to trigger the MTC WTRU 305, the MTC server 335 is also aware of which broadcast channel the MTC WTRU 305 monitors, (in addition to control/reporting cycles).

The MTC server 335 pages the MTC WTRU 305, (via the MME 310) (350). The MME 310 pages the MTC WTRU 305 either via a paging channel or a broadcast channel (355). The MTC WTRU 305 is configured to connect to the MTC server 335 once a trigger is sent (360). The MTC WTRU 305 establishes a connection with the MTC server 335 via IP and provides data (365). The MTC server 335 sends details to the MTC WTRU 305 on new/updated control and reporting periods (370). After reporting is completed, the MTC WTRU 305 enters an IDLE/offline mode (375). The MTC WTRU 305 either detaches or releases a radio resource control (RRC) connection (380). If a paging channel is used, the MTC WTRU 305 may report its DRX cycles to the MME 310 via a detach request or RRC release connection request. During control periods, the MTC WTRU 305 monitors the paging or broadcast channel for triggering (385). During reporting periods, the MTC WTRU 305 establishes a connection with the MTC server 335 to send related information (390). The MTC server 335 may send updated control/reporting information.

Figure 4:
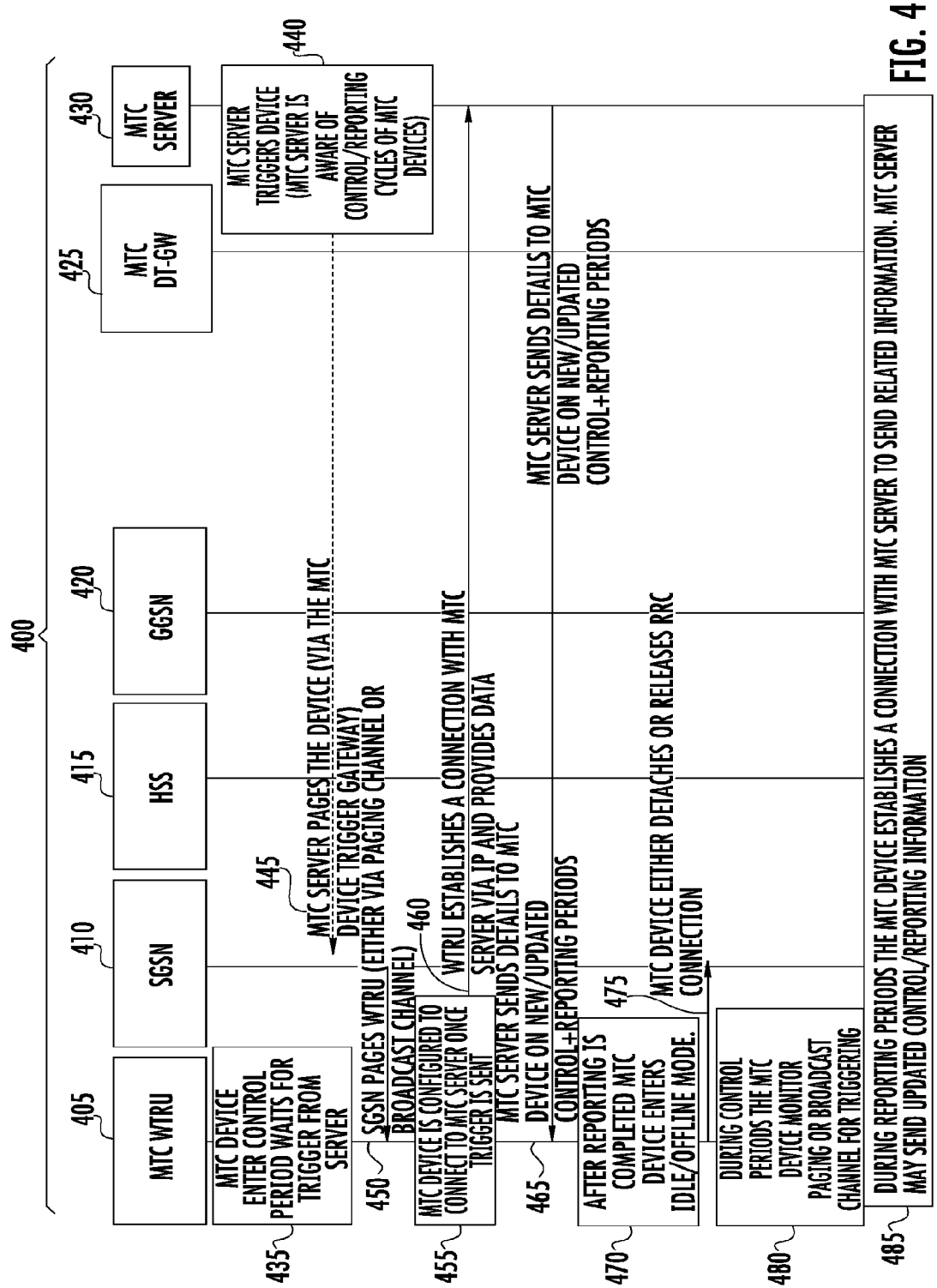
FIG. 4 shows an example signal flow within an MTC architecture in which an MTC server provides control/reporting periods for an universal terrestrial radio access network (UTRAN)/global system for mobile communications (GSM)/enhanced data rates for GSM evolution radio access network (GERAN) case)

FIG. 4 shows an example signal flow within an MTC architecture 400 in which an MTC server 430 provides control/reporting periods in an UTRAN/GERAN case. The MTC architecture 400 includes an MTC WTRU 405, a SGSN 410, an HSS 415, a GGSN 420, an MTC DT-GW 425 and an MTC server 430. The MTC WTRU 405 enters a control period and waits for a trigger from the MTC server 430 (435). If a paging channel is used, the MTC WTRU 405 is configured so that the control period is the same as the DRX cycle. If a broadcast channel is used, the MTC WTRU 405 wakes up during the control period to monitor the broadcast channel for triggering information. The MTC server 430 triggers the MTC WTRU 405, (the MTC server 430 is aware of control/reporting cycles of the MTC WTRU 405) (440). If a paging channel is used to trigger the MTC WTRU 405, the MTC server 430 is aware of DRX cycles. If a broadcast channel is used to trigger the MTC WTRU 405, the MTC server 430 is also aware of which broadcast channel the MTC WTRU 405 monitors, (in addition to control/reporting cycles).

The MTC server 430 pages the MTC WTRU 405, (via the SGSN 410) (445). The SGSN 410 pages the MTC WTRU 405 either via a paging channel or a broadcast channel (450). The MTC WTRU 405 is configured to connect to the MTC server 430 once a trigger is sent (455). The MTC WTRU 405 establishes a connection with the MTC server 430 via IP and provides data (460). The MTC server 430 sends details to the MTC WTRU 405 on a new/updated control and reporting periods (465). After reporting is completed, the MTC WTRU 405 enters an IDLE/offline mode (470). The MTC WTRU 405 either detaches or releases an RRC connection (475). If a paging channel is used, the MTC WTRU 405 may report its DRX cycles to the SGSN 410 via a detach request or RRC release connection request. During control periods, the MTC WTRU 405 monitors the paging or broadcast channel for triggering (480). During reporting periods, the MTC WTRU 405 establishes a connection with the MTC server 430 to send related information (485). The MTC server 430 may send updated control/reporting information.

Figure 5:
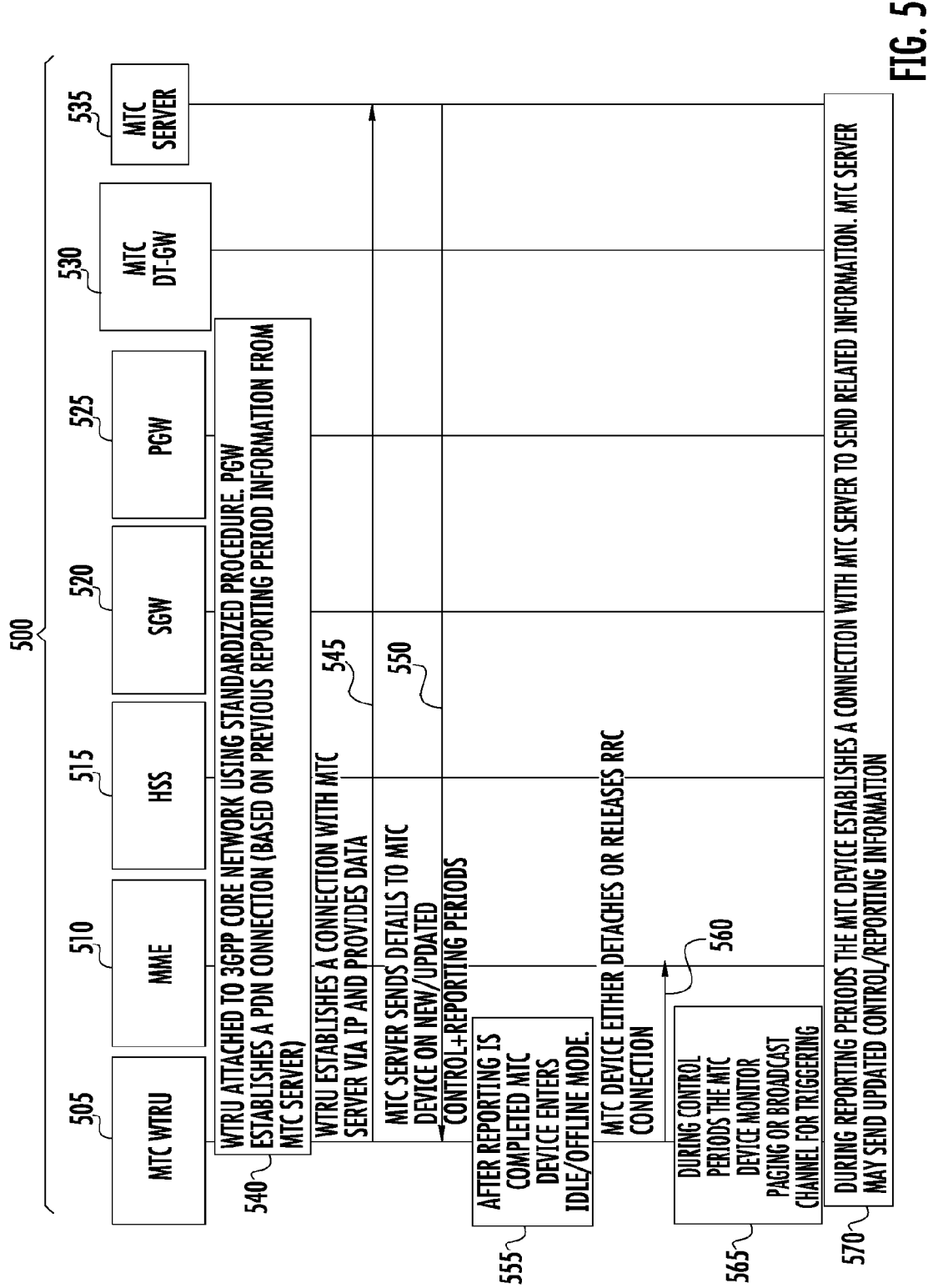
FIG. 5 shows an example signal flow within an MTC architecture in which an MTC WTRU attaches to an MTC server to report data for an E-UTRAN case.

FIG. 5 shows an example signal flow within an MTC architecture 500 in which an MTC WTRU 505 attaches to an MTC server 535 to report data for an E-UTRAN case. The MTC architecture 500 includes an MTC WTRU 505, an MME 510, an HSS 515, a SGW 520, a PGW 525, an MTC DT-GW 530 and an MTC server 535.

The MTC WTRU 505 attaches to a 3GPP core network using a standardized procedure (540). The PGW 525 establishes a PDN connection, (based on previous reporting period information from the MTC server 535. The MTC WTRU 505 establishes a connection with the MTC server 535 via IP and provides data (545). The MTC server 535 sends details to the MTC WTRU 505 on new/updated control and reporting periods (550). The MTC server 535 may send updated control/reporting periods, (e.g., DRX or broadcast channel information). After reporting is completed, the MTC WTRU 505 enters an IDLE/offline mode (555). The MTC WTRU 505 either detaches or releases an RRC connection (560). During control periods, the MTC WTRU 505 monitors the paging or broadcast channel for triggering (565). During reporting periods, the MTC WTRU 505 establishes a connection with the MTC server 535 to send related information (570). The MTC server 535 may send updated control/reporting information.

Figure 6:
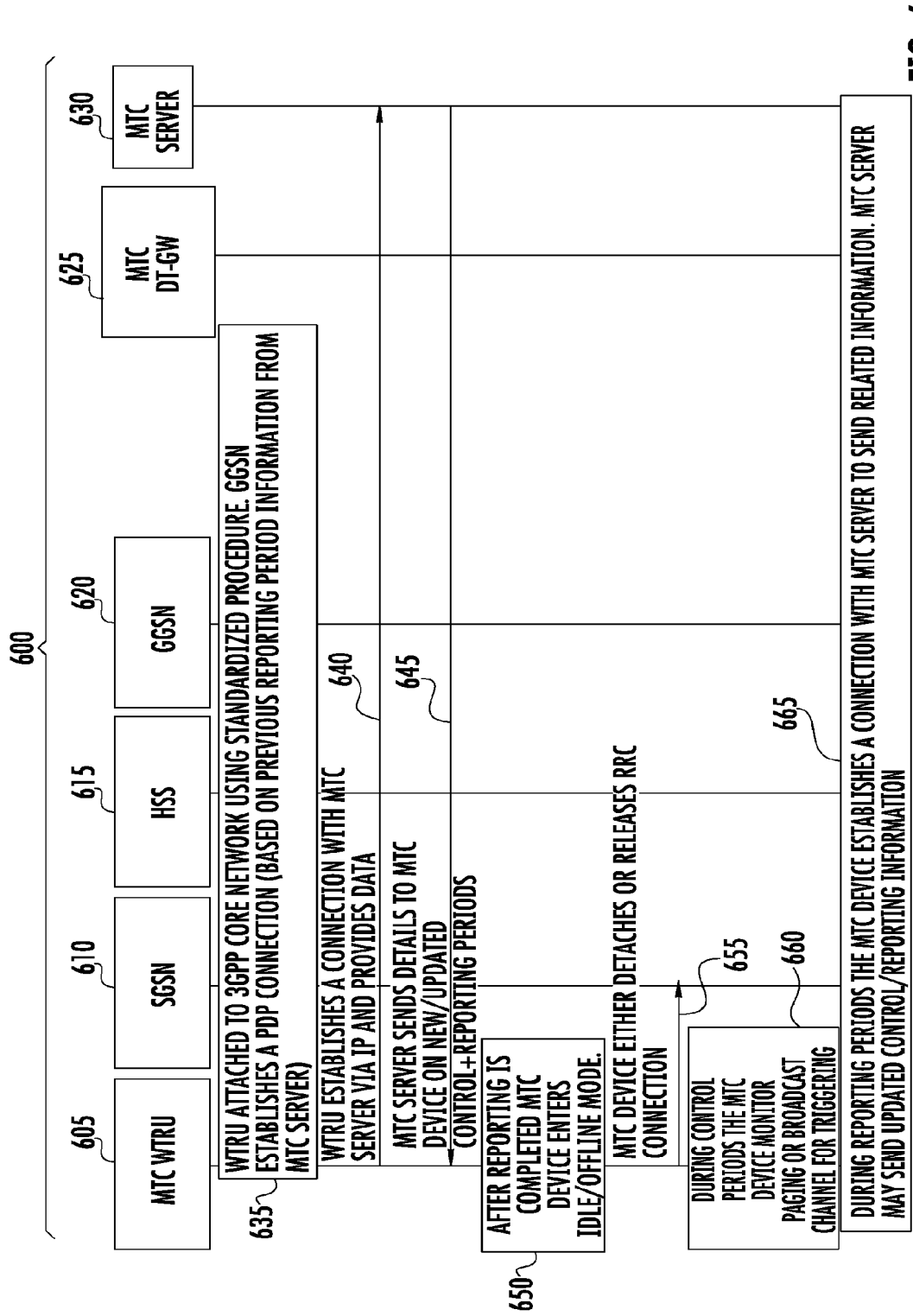
FIG. 6 shows an example signal flow within an MTC architecture in which an MTC WTRU attaches to an MTC server to report data for a UTRAN case.

FIG. 6 shows an example signal flow within an MTC architecture 600 in which an MTC WTRU 605 attaches to an MTC server 630 to report data in an UTRAN case. The MTC architecture 600 includes an MTC WTRU 605, an SGSN 610, an HSS 615, a GGSN 620, an MTC DT-GW 625 and an MTC server 630. The MTC WTRU 605 attaches to a 3GPP core network using a standardized procedure (635). The GGSN 620 establishes a PDN connection, (based on previous reporting period information from the MTC server 630). The MTC WTRU 605 establishes a connection with the MTC server 630 via IP and provides data (640). The MTC server 630 sends details to the MTC WTRU 605 on new/updated control and reporting periods (645). The MTC server 630 may send updated control/reporting periods, (e.g., DRX or broadcast channel information). After reporting is completed, the MTC WTRU 605 enters an IDLE/offline mode (650). The MTC WTRU 605 either detaches or releases an RRC connection. During control periods, the MTC WTRU 605 monitors the paging or broadcast channel for triggering (660). During reporting periods, the MTC WTRU 605 establishes a connection with the MTC server 630 to send related information (665). The MTC server 630 may send updated control/reporting information.

Figure 7:
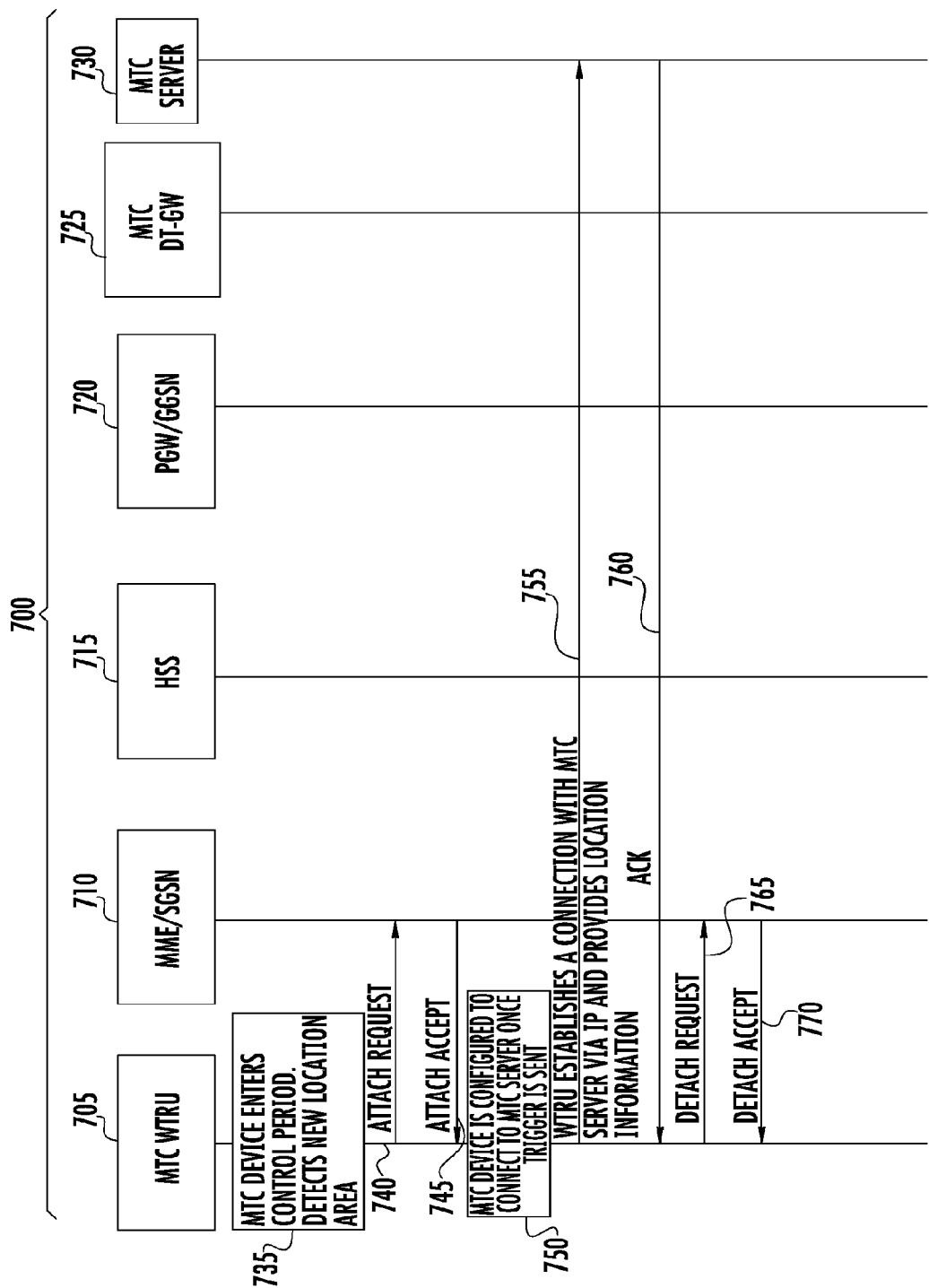
FIG. 7 shows an example signal flow within an MTC architecture in which an MTC WTRU detects a new location area.

FIG. 7 shows an example signal flow within an MTC architecture 700 in which an MTC WTRU 705 detects a new location area. The MTC architecture 700 includes an MTC WTRU 705, an MME/SGSN 710, an HSS 715, a PGW/GGSN 720, an MTC DT-GW 725 and an MTC server 730. The MTC WTRU 705 enters a control period and detects a new location area (735). The MTC WTRU 705 detects a new location area during the control period interval. The MTC WTRU 705 is configured to attach to the network and report location to the MTC server 730. The MTC WTRU 705 sends an attach request message to the MME/SGSN 710 (740). The MME/SGSN 710 sends an attach receipt message to the MTC WTRU 705 (745). The MTC WTRU 705 is configured to connect to the MTC server 730 once a trigger is sent (750). The MTC WTRU 705 establishes a connection with the MTC server 730 via IP and provides location information (755). The MTC server 730 sends a positive acknowledgement (ACK) to the MTC WTRU 705 (760). The MTC WTRU 705 sends a detach request message to the MME/SGSN 710 (765). The MME/SGSN 710 sends a detach accept message to the MTC WTRU 705 (770).

In a second embodiment, an MTC server provides control/reporting periods via an MTCsp interface. In this embodiment, the MTC server includes control/reporting periods within the MTCsp interface when triggering MTC WTRUs. The 3GPP core network, (i.e., HSS/HLR or MME/SGSN), locally stores the information and propagates the information to the MTC WTRU, either via the paging or the broadcast channel. If triggering of the MTC WTRU is carried out via the paging channel, (and optimized DRX cycles are used), the MTC server includes new/updated DRX cycles within the MTCsp interface. The HSS/HLR or MME/SGSN locally stores the information. The new cycles can be sent to the MTC WTRU via attach accept/reject, detach accept/reject or TA update (TAU)/RA update (RAU) accept/reject messages. If triggering of the MTC WTRU is carried out via the broadcast channel, then the control/reporting periods are sent via the MTCsp interface. A specific broadcast channel may be used, (for example a new system information block (SIB)), that provides details for MTC WTRU on control/reporting periods. The MTC WTRU may be pre-configured to monitor a specific SIB (e.g. through universal (U) subscriber identity module (SIM) U(SIM) over-the-air (OTA) or Open Mobile Alliance (OMA) Device Management (DM) procedures).

Figure 8:
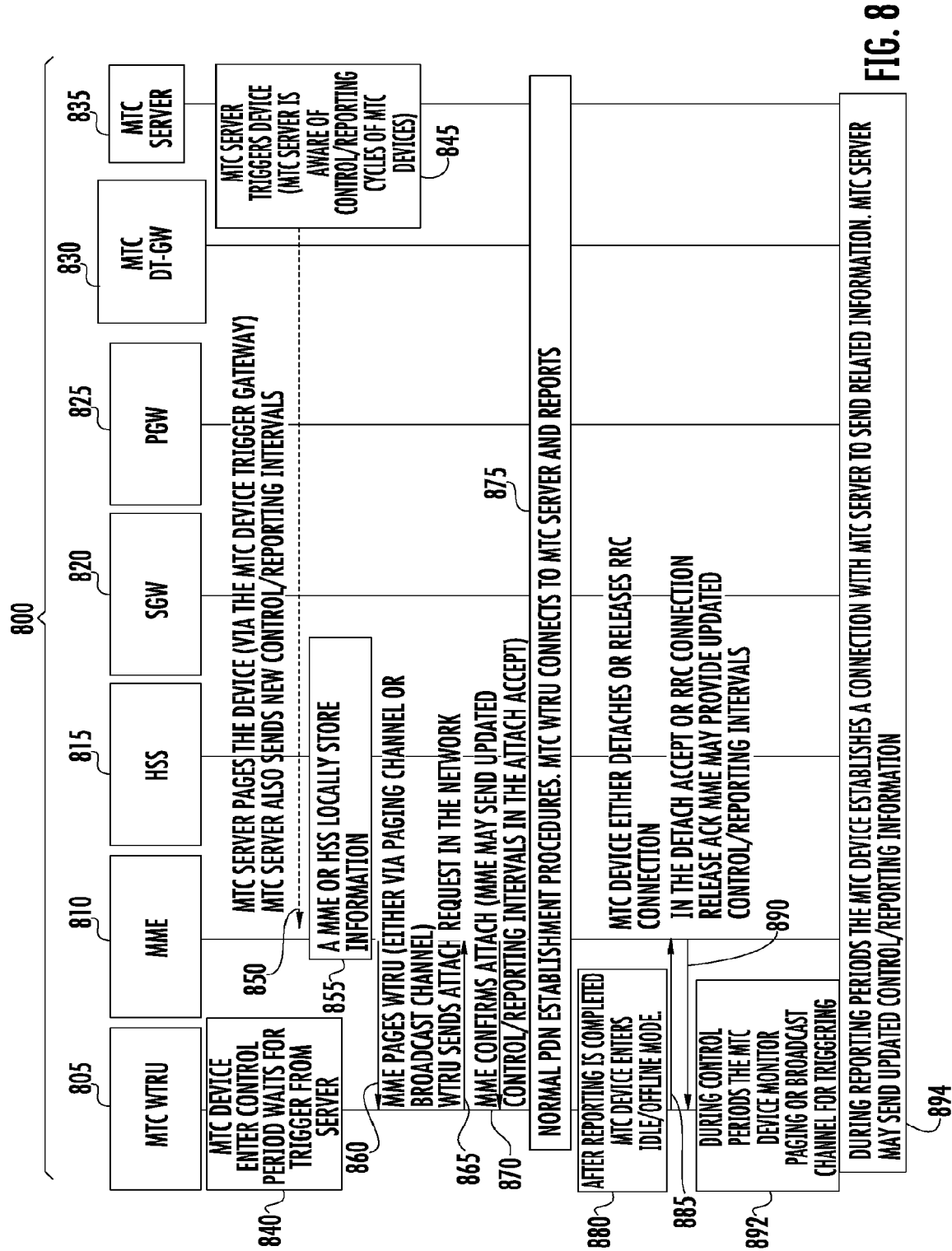
FIG. 8 shows an example signal flow within an MTC architecture in which an MTC server provides control/reporting intervals within an MTCsp interface for an E-UTRAN case.

FIG. 8 shows an signal flow within an MTC architecture 800 in which an MTC server 835 provides control/reporting intervals within the MTCsp interface for an E-UTRAN case. The MTC architecture 800 includes an MTC WTRU 805, an MME 810, an HSS 815, a SGW 820, a PGW 825, an MTC DT-GW 830 and an MTC server 835. The MTC WTRU 805 enters a control period and waits for a trigger from the MTC server 835 (840). If a paging channel is used, the MTC WTRU 805 is configured so that the control period is the same as the DRX cycle. If a broadcast channel is used, the MTC WTRU 805 wakes up during the control period to monitor the broadcast channel for triggering information. The MTC server 835 triggers the MTC WTRU 805, (the MTC server 835 is aware of control/reporting cycles of the MTC WTRU 805) (845). If a paging channel is used to trigger the MTC WTRU 805, the MTC server 835 is aware of DRX cycles. If a broadcast channel is used to trigger the MTC WTRU 805, the MTC server 835 is also aware of which broadcast channel the MTC WTRU 805 monitors, (in addition to control/reporting cycles). The MTC server 835 pages the MTC WTRU 805, (via the MTC DT-GW 830) (850). The MTC server 835 may include control/reporting intervals in the request. This may be done, for example, via MTCsp signaling. If a paging channel is used, DRX cycles are included.

The MME 810 or the HSS 815 may locally store information (855). The MME 810 pages the MTC WTRU 805 either via a paging channel or a broadcast channel (860). The MTC WTRU 805 sends an attach request message to the MME 810 (865). The MME 810 confirms the attach (870). The MME 810 may send updated control/reporting intervals in the attach confirmation message. If a paging channel is used to trigger the MTC WTRU 805, the MME 810 may send updated DRX cycle information in the attach confirmation message. Normal PDN establishment procedures are performed to connect the MTC WTRU 805 and the MTC server 835 (875). The MTC WTRU 805 reports to the MTC server 835.

After reporting is completed, the MTC WTRU 805 enters an IDLE/offline mode (880). The MTC WTRU 805 either detaches or releases an RRC connection (885). In a detach accept message or an RRC connection release ACK, the MME 810 may provide updated control/reporting intervals (890). If a paging channel is used, the MME 810 may report the DRX cycles to the MTC WTRU 805 via a detach accept message or an RRC release connection accept message. During control periods, the MTC WTRU 805 monitors the paging or broadcast channel for triggering (892). During reporting periods, the MTC WTRU 805 establishes a connection with the MTC server 835 to send related information (894). The MTC server 835 may send updated control/reporting information.

Figure 9:
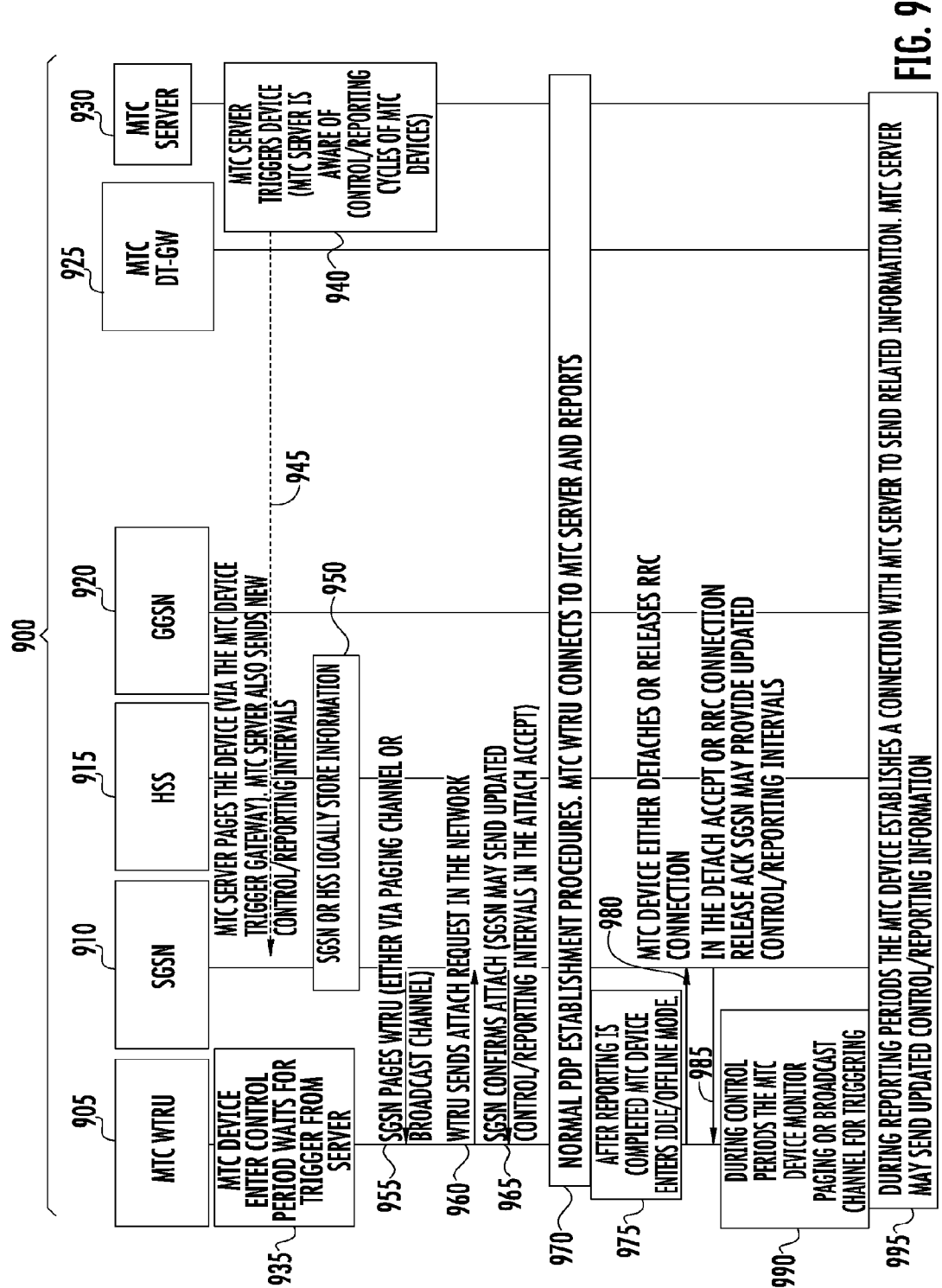
FIG. 9 shows an example signal flow within an MTC architecture in which an MTC server provides control/reporting intervals within an MTCsp interface for an UTRAN case.

FIG. 9 shows an example signal flow within an MTC architecture 900 in which an MTC server 930 provides control/reporting intervals within the MTCsp interface for the UTRAN case. The MTC architecture 900 includes an MTC WTRU 905, an SGSN 910, an HSS 915, a GGSN 920, an MTC DT-GW 925 and an MTC server 930. The MTC WTRU 905 enters a control period and waits for a trigger from the MTC server 930 (935). If a paging channel is used, the MTC WTRU 905 is configured so that the control period is the same as the DRX cycle. If a broadcast channel is used, the MTC WTRU 905 wakes up during the control period to monitor the broadcast channel for triggering information. The MTC server 930 triggers the MTC WTRU 905, (the MTC server 930 is aware of control/reporting cycles of the MTC WTRU 905) (940). If a paging channel is used to trigger the MTC WTRU 905, the MTC server 930 is aware of DRX cycles. If a broadcast channel is used to trigger the MTC WTRU 905, the MTC server 930 is also aware of which broadcast channel the MTC WTRU 905 monitors, (in addition to control/reporting cycles). The MTC server 930 pages the MTC WTRU 905, (via the MTC DT-GW 925) (945). The MTC server 930 may include control/reporting intervals in the request. This may be done, for example, via MTCsp signaling. If a paging channel is used, DRX cycles are included. The SGSN 910 or the HSS 915 may locally store information (950).

The SGSN 910 pages the MTC WTRU 905 either via a paging channel or a broadcast channel (955). The MTC WTRU 905 sends an attach request message to the SGSN 910 (960). The SGSN 910 confirms the attach (965). The SGSN 910 may send updated control/reporting intervals in the attach confirmation message. If a paging channel is used to trigger the MTC WTRU 905, the SGSN 910 may send updated DRX cycle information in the attach confirmation message. The normal PDN establishment procedures are performed, and the MTC WTRU 905 connects to the MTC server 930 and reports (970).

After reporting is completed, the MTC WTRU 905 enters an IDLE/offline mode (975). The MTC WTRU 905 either detaches or releases an RRC connection (980). In a detach accept message or an RRC connection release ACK, the SGSN 910 may provide updated control/reporting intervals (985). If a paging channel is used, the SGSN 910 may report the DRX cycles to the MTC WTRU 905 via a detach accept message or an RRC release connection accept message. During control periods, the MTC WTRU 905 monitors the paging or broadcast channel for triggering (990). During reporting periods, the MTC WTRU 905 establishes a connection with the MTC server 930 to send related information (995). The MTC server 930 may send updated control/reporting information.

Figure 10:
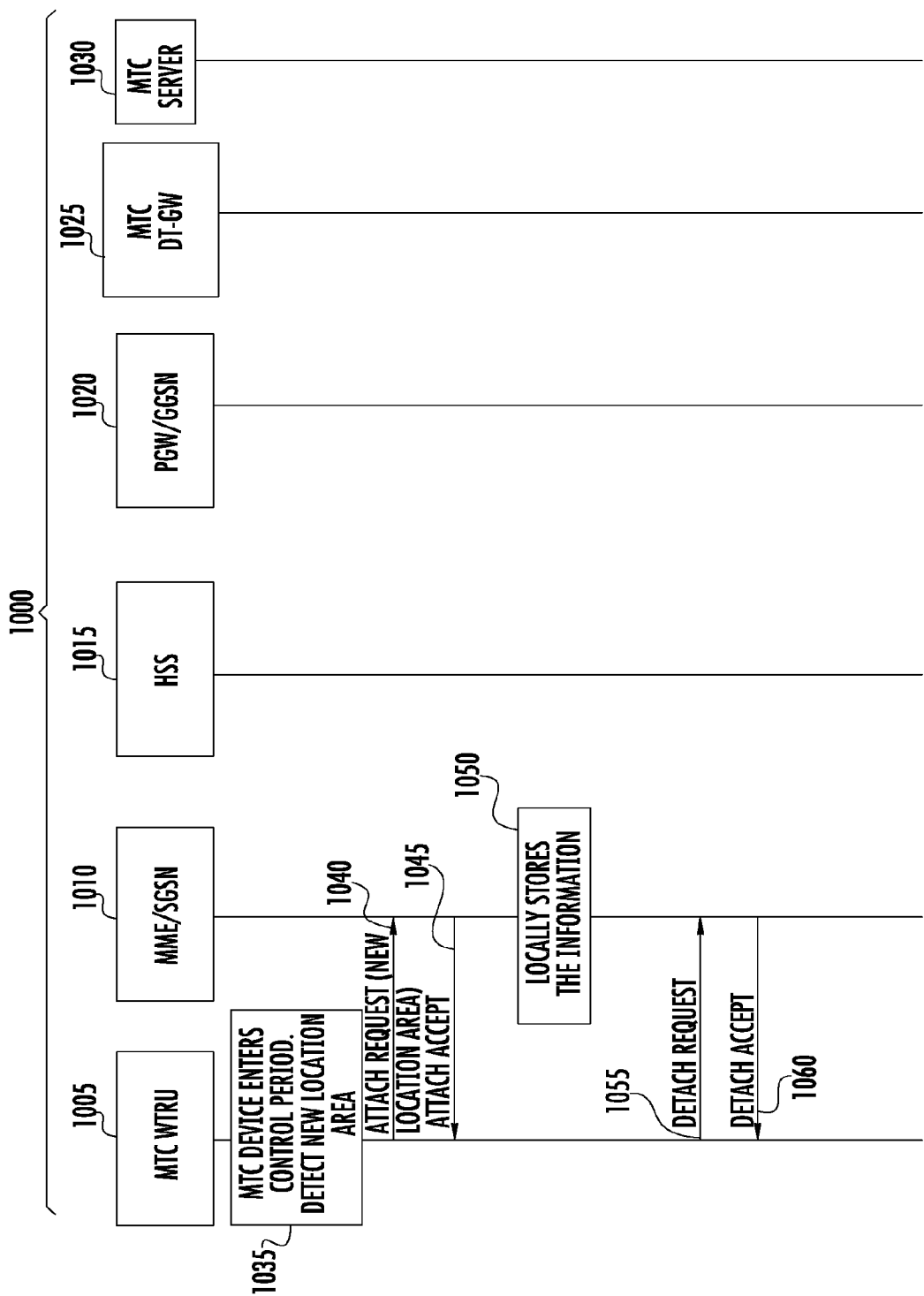
FIG. 10 shows an example signal flow within an MTC architecture in which an MTC WTRU detects a new location area.

FIG. 10 shows an signal flow within an MTC architecture 1000 in which an MTC WTRU 1005 detects a new location area. The MTC architecture 1000 includes an MTC WTRU 1005, an MME/SGSN 1010, an HSS 1015, a PGW/GGSN 1020, an MTC DT-GW 1025 and an MTC server 1030. The MTC WTRU 1005 enters a control period and detects a new location area (1035) (i.e., the MTC WTRU 1005 detects a new location area during the control period interval). The MTC WTRU 1005 is configured to attach to the network and report its location to the MME/SGSN 1010. The MTC WTRU 1005 sends an attach request message to the MME/SGSN 1010 (1040). The MME/SGSN 1010 sends an attach accept message to the MTC WTRU 1005 (1045). The MME/SGSN 1010 may locally store information (1050). The MTC WTRU 1005 sends a detach request message to the MME/SGSN 1010 (1055). The MME/SGSN 1010 sends a detach accept message to the MTC WTRU 1005 (1060).

In a third embodiment, an MTC WTRU/3GPP CN configures control/reporting periods. In this embodiment, the MTC server does not take part in the configuration of the control/reporting periods. The MTC WTRU or the 3GPP CN may provide the control/reporting periods. Configuration may be carried to the MTC WTRU via (U)SIM OTA or OMA DM procedures. The MTC WTRU sends details on its configuration during TAU/RAU, or when attaching to the network, (at attach request). Alternatively, the MME/SGSN may send update control/reporting period information, (and information indicating which broadcast channel to monitor), when communicating with the MTC WTRU, (e.g., at attach accept or TAU/RAU accept or attach reject). Since the MTC server is unaware of control/reporting periods, when the MTC server sends a trigger, the MME/SGSN buffers the request until the MTC WTRU enters its controlling period. The MNO may configure the DRX cycles and send the information via (U)SIM messages, OMA DM, or via any other applicable signaling between the WTRU and the MME/SGSN. With respect to the broadcast channel embodiment, the MTC WTRU may be configured to monitor broadcast channel via (U)SIM OTA or OMA DM. The MME/SGSN may indicate to the MTC WTRU via WTRU MTC-MME/SGSN signaling the updated broadcast channel information.

Figure 11:
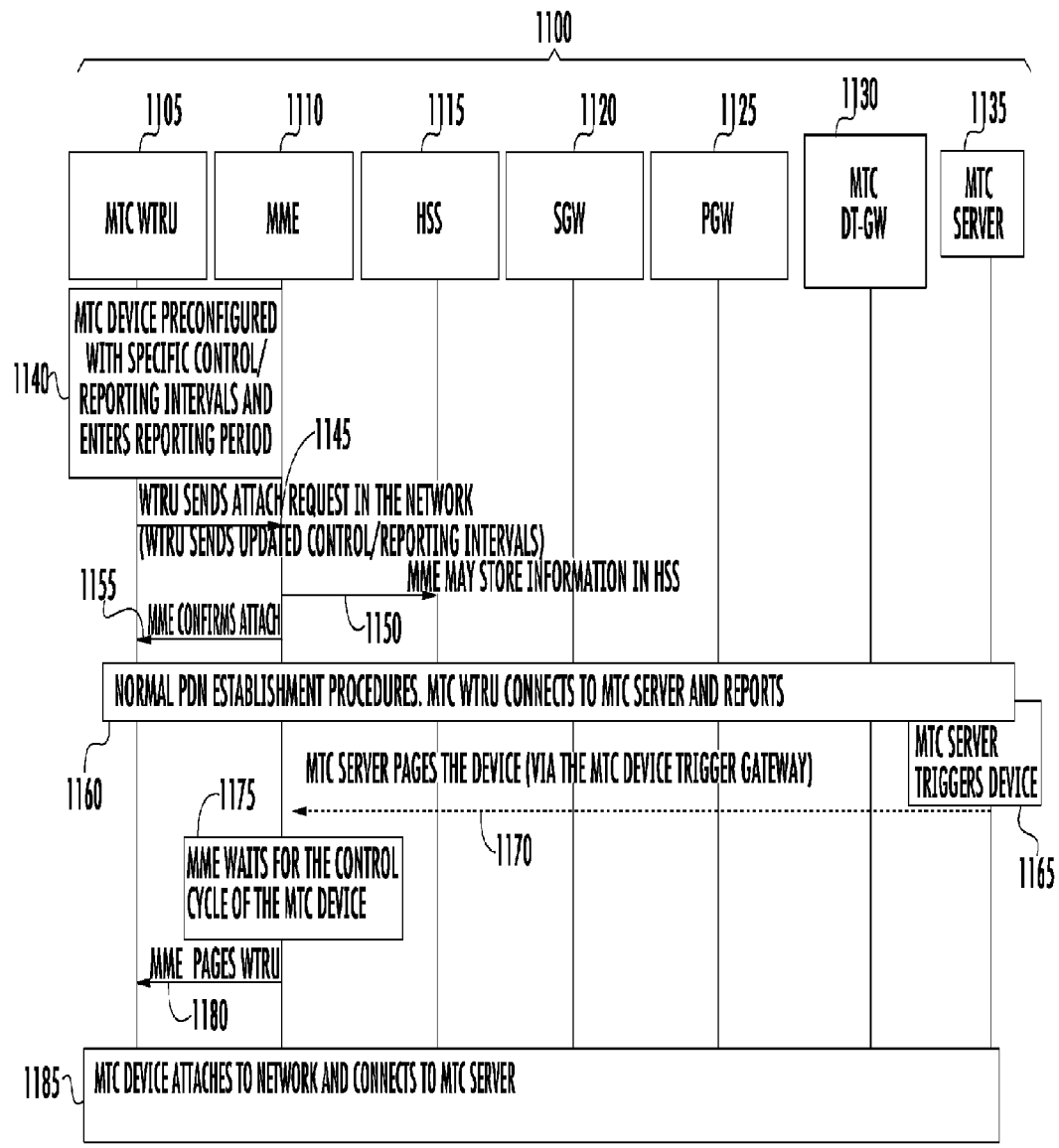
FIG. 11 shows an example signal flow within an MTC architecture in which an MTC WTRU is configured via universal (U) subscriber identity module (SIM) over-the-air (OTA) or Open Mobile Alliance (OMA) Device Management (DM) with control reporting periods for an E-UTRAN case.

FIG. 11 shows an example signal flow within an MTC architecture 1100 in which an MTC WTRU 1105 is configured via universal (U) subscriber identity module (SIM) over-the-air (OTA) or OMA delegated management (DM) with control reporting periods for the E-UTRAN case. The MTC architecture 1100 includes an MTC WTRU 1105, an MME 1110, an HSS 1115, an SGW 1120, a PGW 1125, an MTC DT-GW 1130 and an MTC server 1135. The MTC WTRU 1105 is preconfigured with specific control/reporting intervals and enters a reporting period (1140). If a paging channel is used to trigger the MTC WTRU 1105, the MTC WTRU 1105 is pre-configured with DRX cycles for control periods. The MTC WTRU 1105 sends an attach request message to the MME 1110 (1145). The MTC WTRU 1105 may also send updated control/reporting intervals to the MME 1110. If a paging channel is used to trigger the MTC WTRU 1105, the MTC WTRU 1105 includes the DRX cycles in the attach request message. The MME 1110 may store information in the HSS 1115 (1150). The MME 1110 confirms the attach (1155). The normal PDN establishment procedures are performed, and the MTC WTRU 1105 connects to the MTC server 1135 and reports (1160). The MTC server 1135 triggers the MTC WTRU 1105 (1165). The MTC server 1135 pages the MTC WTRU 1105, (via the MTC DT-GW 1130) (1170). The MME 1110 waits for the control cycle of the MTC WTRU 1105 (1175). The MME 1110 pages the MTC WTRU 1105 (1180). The MTC WTRU 1105 attaches to the network and connects to the MTC server 1135 (1185).

Figure 12:
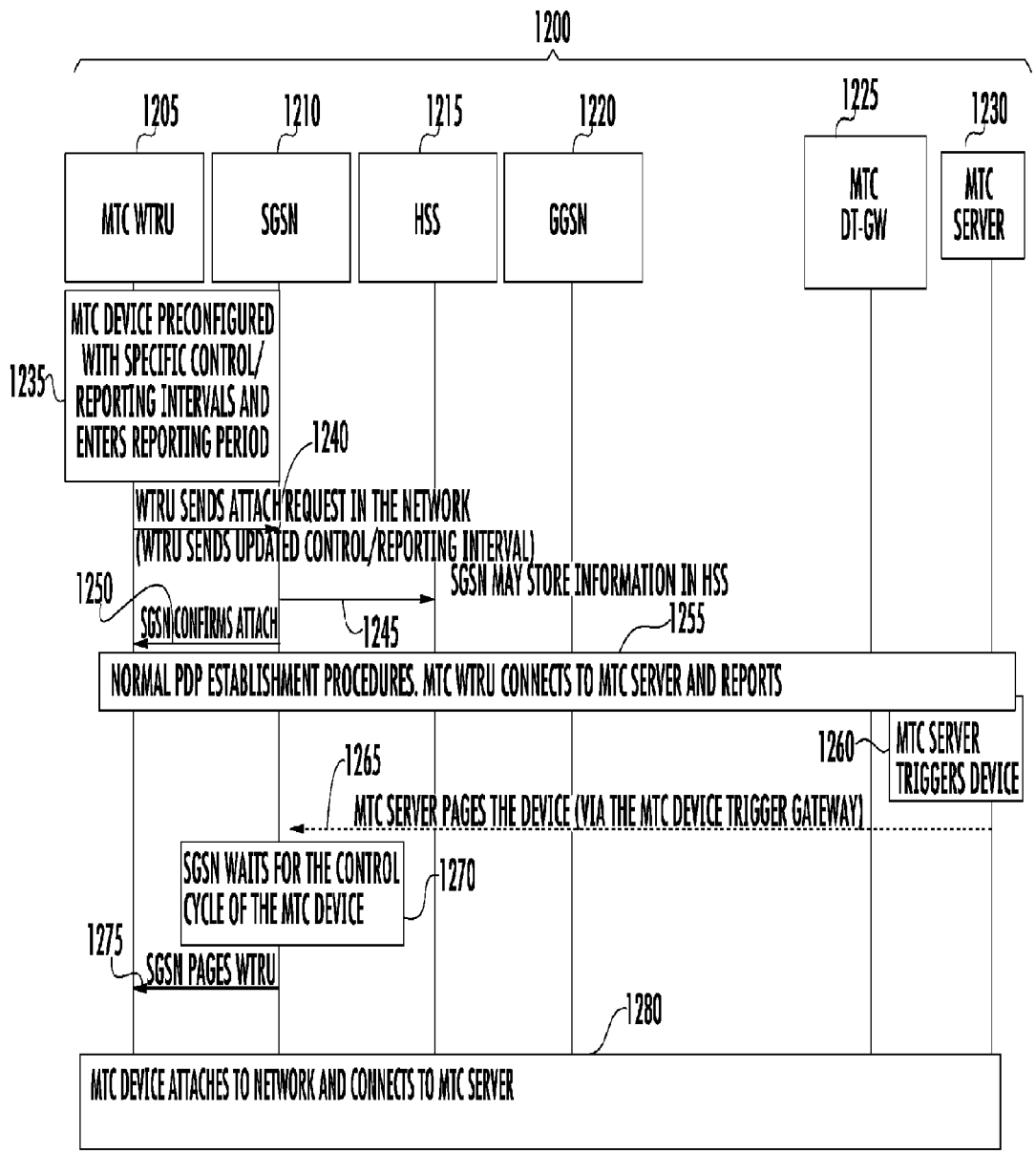
FIG. 12 shows an example signal flow within an MTC architecture in which an MTC WTRU is configured via (U)SIM OTA or OMA DM with control reporting periods for an UTRAN case.

FIG. 12 shows an example signal flow within an MTC architecture 1200 in which an MTC WTRU 1205 is configured via (U)SIM OTA or OMA DM with control reporting periods for the UTRAN case. The MTC architecture 1200 includes an MTC WTRU 1205, an SGSN 1210, an HSS 1215, a GGSN 1220, an MTC DT-GW 1225 and an MTC server 1230. The MTC WTRU 1205 is preconfigured with specific control/reporting intervals and enters a reporting period (1235). If a paging channel is used to trigger the MTC WTRU 1205, the MTC WTRU 1205 is pre-configured with DRX cycles for control periods. The MTC WTRU 1205 sends an attach request message to the network, for example, the SGSN 1210 (1240). The MTC WTRU 1205 may also send updated control/reporting intervals to the SGSN 1210. If a paging channel is used to trigger the MTC WTRU 1205, the MTC WTRU 1205 includes the DRX cycles in the attach request message. The SGSN 1210 may store information in the HSS 1215 (1245). The SGSN 1210 confirms the attach (1250). The normal PDN establishment procedures are performed, and the MTC WTRU 1205 connects to the MTC server 1230 and reports (1255). The MTC server 1230 triggers the MTC WTRU 1205 (1260). The MTC server 1235 pages the MTC WTRU 1205, (via the MTC DT-GW 1225) (1265). The SGSN 1210 waits for the control cycle of the MTC WTRU 1205 (1270). The SGSN 1210 pages the MTC WTRU 1205 (1275). The MTC WTRU 1205 attaches to the network and connects to the MTC server 1235 (1280).

Figure 13:
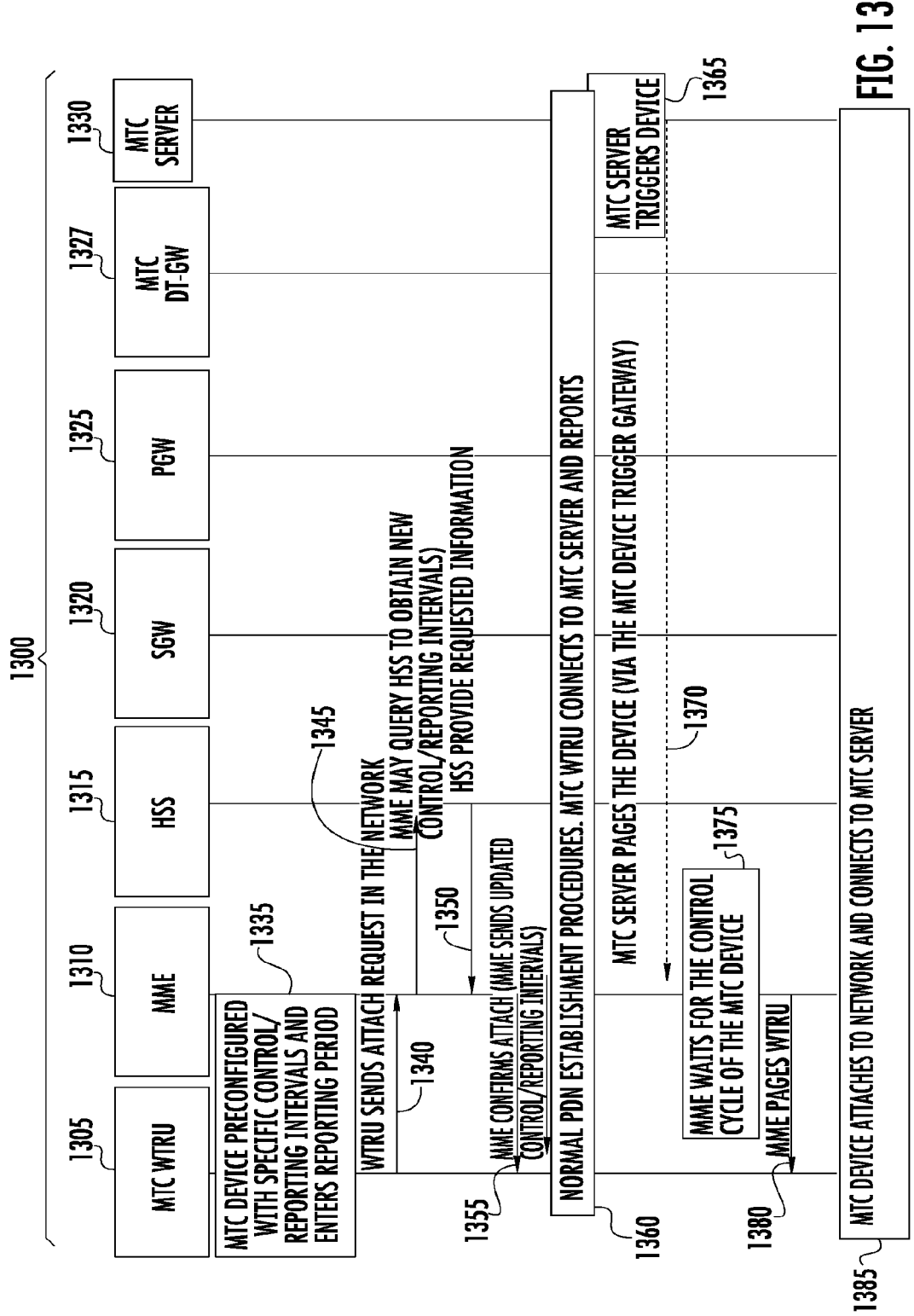
FIG. 13 shows an example MTC architecture in which an MTC WTRU is configured by a 3rd Generation Partnership Project (3GPP) core network (CN) for an E-UTRAN case.

FIG. 13 shows an example signal flow in an MTC architecture 1300 in which an MTC WTRU 1305 is configured by a 3GPP CN for the E-UTRAN case. The MTC architecture 1300 includes an MTC WTRU 1305, an MME 1310, an HSS 1315, an SGW 1320, a PGW 1325 and an MTC server 1330. The MTC WTRU 1305 is preconfigured with specific control/reporting intervals and enters a reporting period (1335). It is assumed that the MTC WTRU 1305 was configured earlier by the 3GPP core network. The MTC WTRU 1305 sends an attach request message to the network, for example, the MME 1310 (1340). The MME 1310 may query the HSS 1315 to obtain new control/reporting intervals (1345). The HSS 1315 provides the requested information to the MME 1310 (1350). The MME 1310 confirms the attach (1355). The MME 1310 sends updated control/reporting cycles, (for example it may include DRX cycles if a paging channel is used for triggering), in the attach accept message. The normal PDN establishment procedures are performed, and the MTC WTRU 1305 connects to the MTC server 1330 and reports (1360). The MTC server 1330 triggers the MTC WTRU 1305 (1365). The MTC server 1330 pages the MTC WTRU 1305 via the MTC DT-GW 1327. The MME 1310 waits for the control cycle of the MTC WTRU 1305 (1375). The MME 1310 pages the MTC WTRU 1305 (1380). The MTC WTRU 1305 attaches to the network and connects to the MTC server 1330 (1385).

Figure 14:
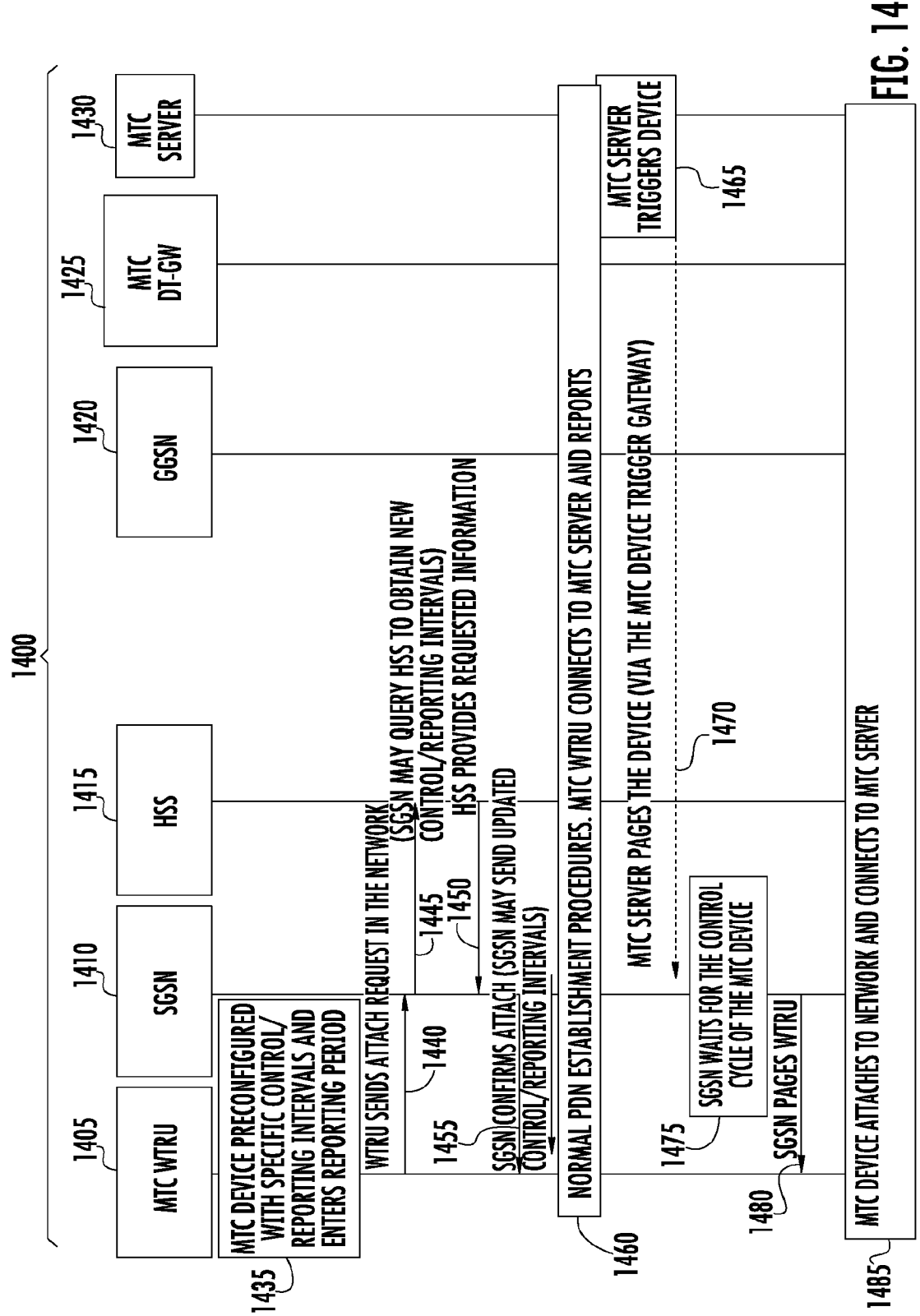
FIG. 14 shows an example MTC architecture in which an MTC WTRU is configured by a 3GPP CN for an UTRAN case.

FIG. 14 shows an example signal flow in an MTC architecture 1400 in which an MTC WTRU 1405 is configured by a 3GPP CN for the UTRAN case. The MTC architecture 1400 includes an MTC WTRU 1405, an SGSN 1410, an HSS 1415, a GGSN 1420, an MTC DT-GW 1425 and an MTC server 1430. The MTC WTRU 1405 is preconfigured with specific control/reporting intervals and enters a reporting period (1435). It is assumed that the MTC WTRU 1405 was configured earlier by the 3GPP core network. The MTC WTRU 1405 sends an attach request message to the network, for example, the SGSN 1410 (1440). The SGSN 1410 may query the HSS 1415 to obtain new control/reporting intervals (1445). The HSS 1415 provides the requested information to the SGSN 1410 (1450). The SGSN 1410 confirms the attach (1455). The SGSN 1410 sends updated control/reporting cycles, (for example it may include DRX cycles if a paging channel is used for triggering), in the attach accept message. The normal PDN establishment procedures are performed, and the MTC WTRU 1405 connects to the MTC server 1430 and reports (1460). The MTC server 1430 triggers the MTC WTRU 1405 (1465). The MTC server 1430 pages the MTC WTRU 1405, (via the MTC DT-GW 1425) (1470). The SGSN 1410 waits for the control cycle of the MTC WTRU 1405 (1475). The SGSN 1410 pages the MTC WTRU 1405 (1480). The MTC WTRU 1405 attaches to the network and connects to the MTC server 1430 (1485).

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A method of paging a machine type communication (MTC) wireless transmit/receive unit (WTRU), the method comprising:
   receiving, by the MTC WTRU, a message that indicates control period configuration information associated with an extended discontinuous reception (DRX) cycle and reporting period configuration information;
   monitoring, by the MTC WTRU, a paging channel during a control period;
   receiving, by the MTC WTRU, a paging message during the control period;
   attaching to a network, by the MTC WTRU, in response to receiving the paging message;
   receiving, by the MTC WTRU, a trigger message; and
   in response to receiving the trigger message, the MTC WTRU connecting to an MTC server and transmitting data to the MTC server, during a reporting period.

2. The method of claim 1, wherein the message is received from a mobility management entity (MME).

3. The method of claim 2, wherein the MME is aware of the control period and extended DRX cycle of the MTC WTRU.

4. The method of claim 1, wherein the message is a non-access stratum (NAS) message.

5. The method of claim 1, wherein the MTC server is aware of the control period and extended DRX cycle of the MTC WTRU.

6. The method of claim 1 further comprising the MTC WTRU entering an idle/offline mode after transmitting data to the MTC server or after the control period.

7. The method of claim 1, wherein the MTC WTRU connects to the MTC server via a packet data network (PDN) connection.

8. The method of claim 1, wherein a mobility management entity (MME) sends the paging message to the MTC WTRU upon a request from the MTC server.

9. The method of claim 8, wherein the request is sent from the MTC server to the MME via a device trigger gateway.

10. The method of claim 1, further comprising transmitting, by the MTC WTRU, extended DRX information.

11. The method of claim 10, wherein the extended DRX information is transmitted in at least one of a tracking/routing area update message or an attach/detach request message.

12. The method of claim 1, further comprising receiving, by the MTC WTRU, a message that includes updated control period configuration information.

13. The method of claim 12, wherein the updated control period configuration information is received in at least one of an attach accept/reject, detach accept/reject, or tracking area update/routing area update accept/reject message.

14. The method of claim 12, wherein the updated control period configuration information is received from at least one of a serving general packet radio service support node (SGSN), a mobility management entity (MME), or the MTC server.

15. A machine type communication (MTC) wireless transmit/receive unit (WTRU) comprising:
   circuitry configured to receive a message that indicates control period configuration information associated with an extended discontinuous reception (DRX) cycle and reporting period configuration information;
   circuitry configured to monitor a paging channel during a control period;
   circuitry configured to receive a paging message during the control period;
   circuitry configured to attach to a network in response to receiving the paging message;
   circuitry configured to receive a trigger message; and
   circuitry configured to connect, in response to receiving the trigger message to an MTC server and to transmit data to the MTC server, during a reporting period.

16. The MTC WTRU of claim 15, wherein the message is received from a mobility management entity (MME).

17. The MTC WTRU of claim 16, wherein the MME is aware of the control period and extended DRX cycle of the MTC WTRU.

18. The MTC WTRU of claim 15, wherein the message is a non-access stratum (NAS) message.

19. The MTC WTRU of claim 15, wherein the MTC server is aware of the control period and extended DRX cycle of the MTC WTRU.

20. The MTC WTRU of claim 15 wherein the MTC WTRU is configured to enter an idle/offline mode after the MTC WTRU transmits data to the MTC server or after the control period.

* * * * *